United States Patent
Agarwal et al.

(10) Patent No.: US 9,800,470 B2
(45) Date of Patent: Oct. 24, 2017

(54) METHODS AND SYSTEM FOR AUTOMATED OR USER-ASSISTED GROUPING AND MANAGEMENT OF GROUPS IN CLOUD INFRASTRUCTURE AND NETWORK

(71) Applicant: F5 Networks, Inc., Seattle, WA (US)

(72) Inventors: Ankit Agarwal, Mountain View, CA (US); Marion Le Borgne, San Francisco, CA (US); Pascale Vicat-Blanc, San Francisco, CA (US)

(73) Assignee: F5 Networks, Inc., Seattle, WA (US)

( * ) Notice: Subject to any disclaimer, the term of this patent is extended or adjusted under 35 U.S.C. 154(b) by 138 days.

(21) Appl. No.: 14/537,894

(22) Filed: Nov. 10, 2014

(65) Prior Publication Data

US 2015/0288569 A1     Oct. 8, 2015

Related U.S. Application Data

(60) Provisional application No. 61/902,269, filed on Nov. 10, 2013.

(51) Int. Cl.
| | | |
|---|---|---|
| *G06F 15/173* | (2006.01) | |
| *H04L 12/24* | (2006.01) | |
| *G06F 9/50* | (2006.01) | |
| *H04L 12/26* | (2006.01) | |

(52) U.S. Cl.
CPC ............ *H04L 41/12* (2013.01); *G06F 9/5072* (2013.01); *H04L 41/08* (2013.01); *H04L 41/0879* (2013.01); *H04L 41/0883* (2013.01); *H04L 41/0886* (2013.01); *H04L 43/0811* (2013.01); *H04L 43/0888* (2013.01)

(58) Field of Classification Search
CPC ............. H04L 47/828; H04L 41/0806; H04L 41/0816; H04L 41/22
USPC .................................................. 709/203, 224
See application file for complete search history.

(56) References Cited

U.S. PATENT DOCUMENTS

| | | | | |
|---|---|---|---|---|
| 6,966,033 B1 * | 11/2005 | Gasser | ................... | H04L 41/22 715/738 |
| 8,296,434 B1 * | 10/2012 | Miller | ................. | H04L 67/1029 709/220 |
| 2008/0294777 A1 * | 11/2008 | Karve | ....................... | G06F 8/60 709/226 |

(Continued)

*Primary Examiner* — Duyen Doan
(74) *Attorney, Agent, or Firm* — LeClairRyan, a Professional Corporation

(57) ABSTRACT

Disclosed are methods and apparatus for implementing in an electronic device that includes a processor and memory. Virtual resources, which are associated with an execution of a user's applications in a cloud resource configuration including virtual machines, network services and storage, are identified. A first topology map of the virtual resources, including a plurality of nodes, is generated. The first topology map, including the nodes, is output. A vector, which is associated with each node, said vector including one or more features associated with each node, is generated. Based upon the vectors, a distribution of the plurality of nodes within two or more groups is determined. A second topology map, including each of the node groups in one of a collapsed format, wherein only a identifier of the node group is output or an expanded format, wherein a portion of the plurality of nodes the node group are output, is output.

17 Claims, 37 Drawing Sheets

(56) References Cited

U.S. PATENT DOCUMENTS

2012/0159249 A1\* 6/2012 Son ................. G06F 11/079
 714/25
2014/0215058 A1\* 7/2014 Vicat-Blanc ........... H04L 43/14
 709/224

\* cited by examiner

TYPES OF GROUPS
BY APPLICATION
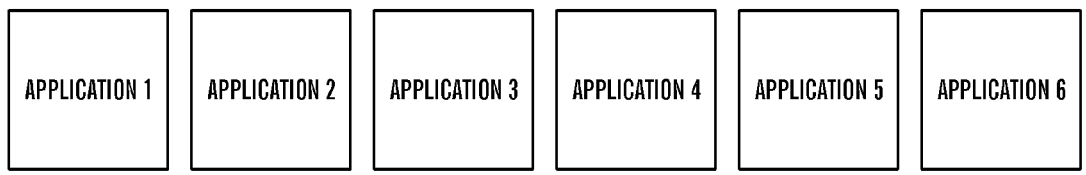
BY ARCHITECTURE
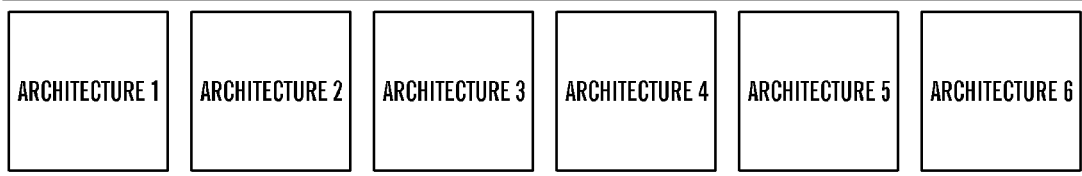
BY OS
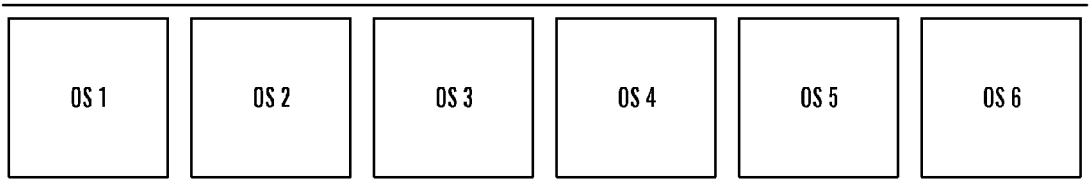
BY TEAM
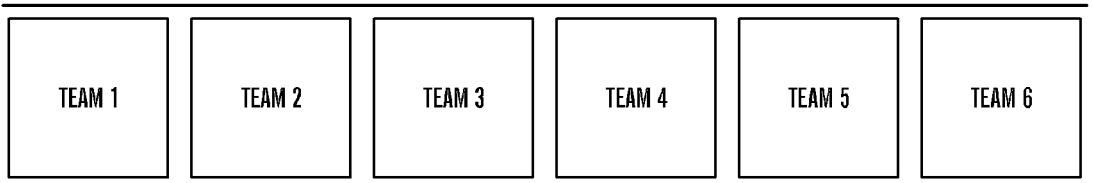
*FIG. 8*

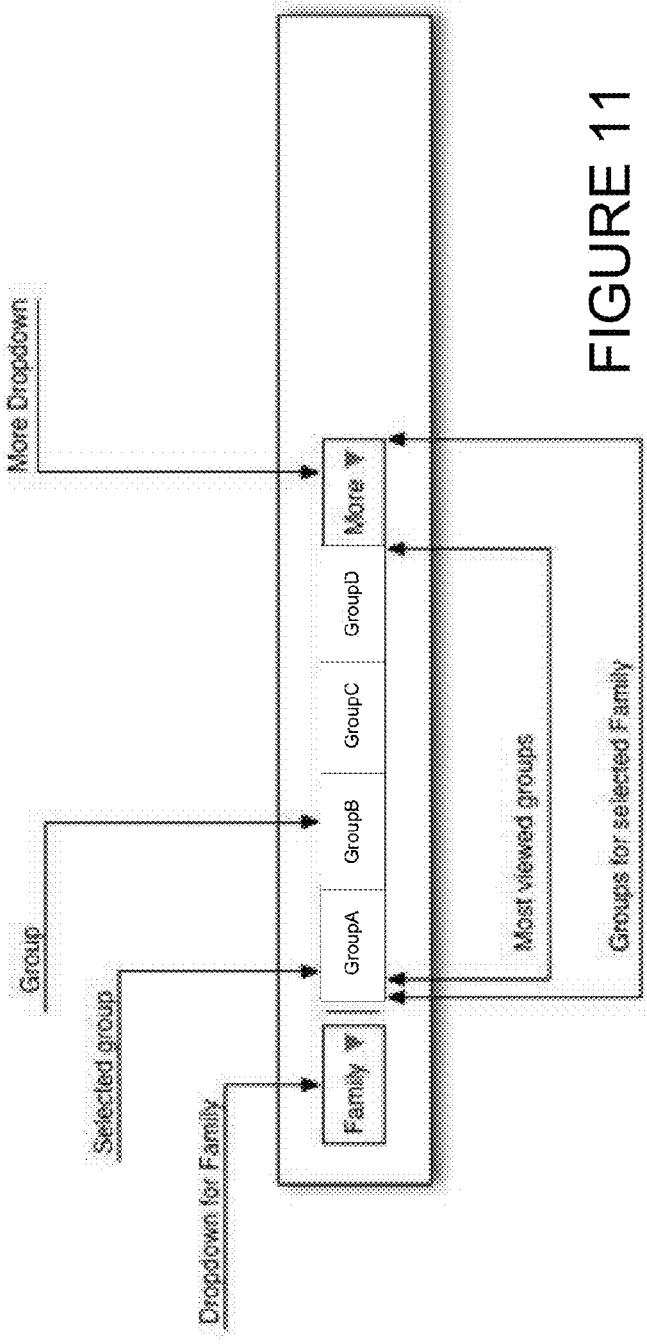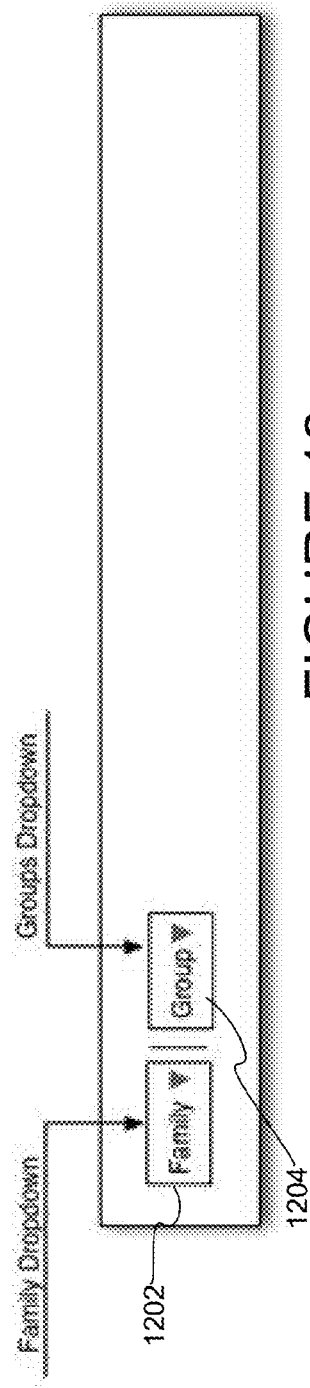

CREATE SMART FAMILY

EXAMPLE

SELECT CHARACTERISTICS TO GROUP ON

☐ Security Groups
- SPOT1-SG ×  DEFAULT ×  LAUNCH-WIZARD-13 ×
- SPOT3-SG ×  SPOT5-SG ×  MySocGroup ×
- ALL OPEN ×  QUICK-START-1 ×  WEB ×
- SPOT2-SG ×  SPOT4-SG ×  TAG ☑ Key Pairs
- cw-keys-california.pem ×  cw-keys.pem ×
- cwd-keys-california.pem ×  cwd-keys-oreg.pem ×
- TAG ☐ Auto Scaling Groups
- ...-west-1:259524812876autoScalingGroup
- TAG ☐ Instance Tags
- TEMPERATURE ×  Service5 ×  boxname ×
- COLOR ×  Name ×  tag-1 ×  Service3 ×
- Service4 ×  tag-5 ×  TEMPERATURE dd ×
- Service1 ×  tag-2 ×
- ...autocallinggroupName ×  tag-3 ×
- Service2 ×  tag-? ×  boxname3 ×  tag-6 ×
- Name ×  tag-7 ×  COLORS ×  tag-1 ×  TAG

[ CANCEL ]  [ CREATE FAMILY ]

*FIG. 22*

METHODS AND SYSTEM FOR AUTOMATED OR USER-ASSISTED GROUPING AND MANAGEMENT OF GROUPS IN CLOUD INFRASTRUCTURE AND NETWORK

CROSS-REFERENCE TO RELATED APPLICATION

This application claims priority of U.S. Provisional Patent Application No. 61/902,269, entitled METHODS AND SYSTEMS FOR AUTOMATED USER-ASSISTED GROUPING AND MANAGEMENT OF GROUPING IN CLOUD INFRASTRUCTURE AND NETWORK, filed 10 Nov. 2013 by Ankit AGARWAL, et al., which application is incorporated herein by reference in its entirety for all purposes.

FIELD OF THE INVENTION

The invention relates to the area of managing virtual resources in a cloud environment more particularly the invention is related to a system and a user interface associated with grouping entities and visualizing the relationship, influence, and performance of grouped entities in the context of virtual networks and clouds.

DESCRIPTION OF THE RELATED ART

In the cloud, applications are deployed over virtual resources that are dynamically provisioned and mapped to a pool of physical servers that are allowed to communicate in some manner through some type of physical network. From a customer perspective, the virtual resources are typically virtual machines that execute customer applications. The machines are "virtual" in the sense that the underlying physical servers on which the virtual machines are operating can change over time (migration) and a variable number of virtual machines are running on the same physical server, sharing the underlying processor, memory, disk and network interface capabilities (sharing). Using the representation of a virtual machine, the changing nature of the physical servers is opaque to customer applications.

The customer applications often include components that execute on different virtual machines that need to communicate with one another to complete a particular task. Thus, a virtual network is formed between the virtual machines where the performance of the virtual resources including both the virtual network and the virtual machines affects how quickly the particular task is completed within the customer application. The performance of the virtual resources is constantly changing and is difficult to characterize as the underlying physical resources are constantly changing. In addition, for a particular customer application, how the application interacts with the virtual resources affects the perceived performance of the virtual resources from the point of view of the application. The coupling between the application and the resources adds additional complexity to characterizing performance in a cloud environment.

When performance is characterized, another challenge is finding the right balance between presenting too much or too little performance characterization information. When too little, it is difficult for the user to make good decisions which increase the overall performance of the system. Further, when too much information is presented, it is also difficult for the user to make good decisions which increase the overall performance of the system. As the number of virtual resources increases, the amount of characterization information which is available increases in an exponential manner. As the number of virtual resources become large, it becomes more difficult to find the right balance of performance characterization information which both captures the complexity of the system and yet doesn't overwhelm the user with too much information.

Besides the amount of information, the format in which the characterization information is presented is also important. There is not a standard for presenting performance characterization information in a cloud environment. Different users have different preferences in regards to the type and format of information which they need to help them make good decisions. These preferences typically evolve from the particular experiences a user has had in managing cloud resources or other types of networked resources.

Every customer utilizing cloud resources wants to ensure that their applications are sufficiently optimized to meet the demands of their business at all times while not wasting resources. Optimization requires a dynamic characterization of cloud resource performance, which varies from application to application. To make effective and actionable optimization decisions, the characterization information needs to be presented in a user friendly manner which is in accordance with user preferences where the presentation accounts for varying levels of system complexity. Currently, such tools are very limited or non-existent. In view of the above, new methods and apparatus for presenting performance characterization information in a cloud network are needed.

SUMMARY

Methods and apparatus which enable the grouping of entities are described. The grouping tools can be applied to the management of all non-functional properties, such as availability, security and performance. For example, visualizing the performance of grouped entities is described. An important property of scalable application is the parallelization of the task. Typically a job is split into numerous tasks, which are distributed to a set of "workers" working in parallel. Therefore, besides "non-functional" property assessment and optimization. Functional grouping can be helpful for designing or understanding the scalability of distributed application architecture.

In one embodiment, the entities can be nodes. In particular, details of a user interface which enables a user to i) manually group nodes, ii) specify parameters which allow the system to automatically group nodes, iii) view relationships between nodes (e.g., provisioned virtual links) and iv) view performance characteristics associated with grouped nodes are discussed. Flows and heatmaps can be generated between the nodes. The flows between the group nodes and heat maps can help to identify the relationships between the system entities, such as nodes, and overall system characteristics. In addition, details of a method, including a machine learning algorithm, which generates an initial grouping of nodes from a set of ungrouped nodes and then each time a new node is added generates a recommendation of a node grouping in which to place the newly added node is described.

BRIEF DESCRIPTION OF THE DRAWINGS

FIG. 8 illustrates family groups according to different family grouping parameters in accordance with one implementation of the present invention.

FIG. 11 shows a large version of a global group controller in accordance with one embodiment of the present invention.

FIG. 12 shows a small version of a global group controller in accordance with one embodiment of the present invention.

FIG. 22 represents a UI state for generating families in accordance with one embodiment of the present invention.

DETAILED DESCRIPTION OF THE DESCRIBED EMBODIMENTS

Figure 1:
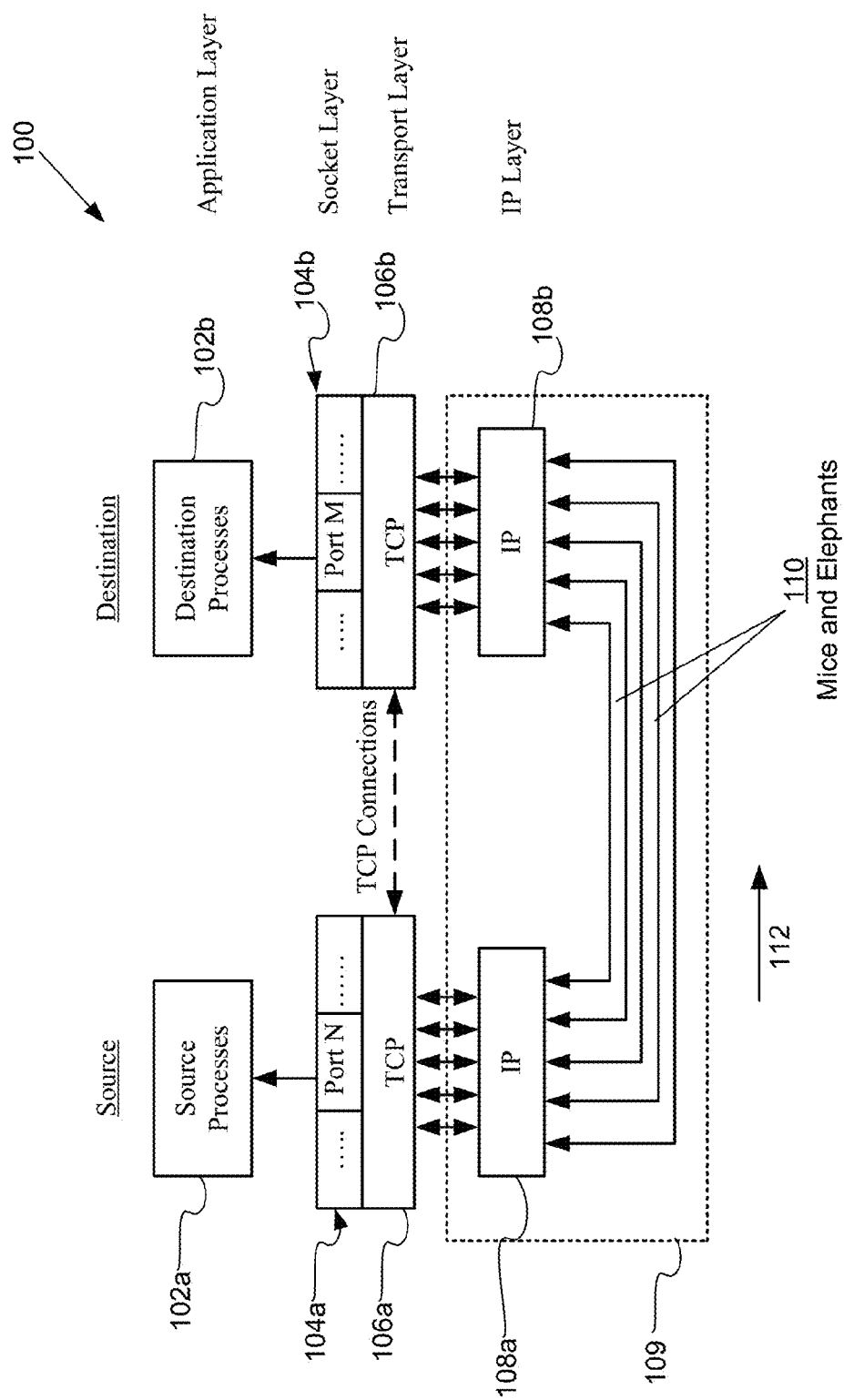
FIG. 1 shows a flow path representation, including a source and a destination, for one embodiment.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

As will be described in more detail below, methods and apparatus related to the grouping of entities in a cloud environment are discussed. One such entity which can be grouped is a node. However, other entities can be grouped and the example of a node is for the purposes of illustration only and is not meant to be limiting.

The grouping of nodes can be helpful when attempting to understand system properties in a cloud environment, like availability, security and performance, where the system includes a large number of nodes (e.g., more than twenty single nodes). The node groups can be visualized in a manner similar to single nodes. For example, flows can be generated and visualized between node groups. However, each node group can be expanded to allow a user to also view such properties, as availability, performance and security related data associated with the nodes within each node group. The functional grouping of nodes can also be useful in designing and understanding the scalability of a distributed application architecture in the cloud or on a dedicated system. Tools useful in this application can also be provided.

In particular embodiments, methods are described which are related to initially grouping a set of ungrouped nodes. Based upon user selected node characteristics, the system can be configured to automatically generate a node grouping and present it to a user. The system can be configured to allow the user to accept and/or modify the generated node grouping. Further, the system can be configured to generate and maintain multiple node groupings grouped according to different node characteristics. Tools used to generate, configure, and view a node grouping can be provided in a graphical user interface associated with the system.

After an initial node grouping is generated, each time a new node is added, the system can be configured to recommend a node grouping for the new node. The recommendations can be generated using a machine learning algorithm which accounts for user modifications to the node grouping, such as moving a node from one node grouping to another node grouping. The machine learning algorithm can increase the likelihood that the recommended node grouping generated for the new node is accepted by the user.

Once the node grouping is specified, performance characteristics associated with the node grouping can be generated. For example, information associated with a flow between two node groupings can be provided. Within the user interface, the node groupings can be expanded to allow a user to view performance characteristics between nodes within a node grouping. For example, flows and heatmaps between nodes in a node grouping can be generated and output to via the user interface.

With respect to the following figures, first a system architecture involving ungrouped nodes in a cloud environment is described. In particular, the system architecture associated with single nodes is discussed with respect to FIGS. 1-4 in the section titled, "System Architecture." In the "System Architecture" section, some examples of methods used to analyze the network performance between different nodes, such as flows and heat maps, are discussed. Next, an overview of a system configured to implement the system architecture in a cloud environment is described with respect to FIGS. 5 and 6 in the section titled, "System Overview." Finally, methods and apparatus, including a graphical user interface, associated with grouping nodes and viewing the performance characteristics of grouped nodes are described with respect to the section titled, "Node Grouping," and FIGS. 7-22 and 23A~23O.

System Architecture

In the cloud, computing and communication resources are dynamically provisioned and managed to implement an application. The cloud includes software or hardware components which process, store, or transport data in a cloud. There are resources which can be dynamically provisioned and managed by cloud infrastructure users and other which cannot. A resource can be a virtual machine, a virtual load balancer, a virtual router, a virtual switch or a virtual link. A manageable resource is a resource which can be reconfigured and monitored by a cloud infrastructure user. A provisionable resource is a resource which can be dynamically provisioned and allocated to a specific cloud user for a period of time.

FIG. 1 shows a representation of a flow path, including a source and a destination, for one embodiment. Two components of the architecture described herein are a flow and a path. A flow or path can be aa representation of resources between a source resource and a destination resource used to carry data between two points. In one embodiment, the flow or path starts at the source's socket layer 104a and ends at the destination's socket layer 104b. The illustrated flow moves in direction 112. In a specific example, a source process 102a may initiate a flow in the source socket layer 104a, which transmits through transport layer 106a and then IP layer 108a. A destination IP layer 108b receives data from such source IP layer 108a, which is then received through destination transport layer 106b and destination socket layer 104b, and finally received by a destination process 102b.

A source or a destination of a flow or a path can be any type of logical resource. As described above, a resource is a dynamically provisioned and manageable software or hardware component which has a functional role in an application. For example, the role may be to process, store or transport data in a cloud. In one embodiment, the resource can be a logical entity. For example, it can be a virtual machine, a network service or a storage space. A resource can also be a group of similar resources. In this case, the flow between clustered resources is the aggregation of the individual flows between the clustered resources and the destination resource. This flow is also named a flow group.

The resource can be identified by its universally unique identifier (UUID). A UUID is an identifier standard used in software construction, standardized by the Open Software Foundation as part of the Distributed Computing Environment. The intent of UUIDs is to enable distributed systems to uniquely identify information without significant central coordination.

A resource can implement a transport layer, which multiplexes and demultiplexes data from different connections and communicates with the application processes via sockets. The connections are characterized by IP addresses and ports (e.g., 104a, 104b). As example, the transport layers can be UDP or TCP. In TCP/IP, every accessible server (in this case, virtual machines) has one or more IP addresses and each of those IP addresses has a large range (0-65,535) of "ports" that can be used. Connections to servers can be made based on a combination of IP address plus port. Services running on the server that accept incoming requests designate what IP/port combination they are going to listen to, and only one service can listen to any combination at one time.

A flow can represent the data exchanged between a source and a destination during a period of time. As indicated FIG. 1, a flow starts at the source transport layer 106a and ends at the destination transport layer 106b. As shown in FIG. 1, a flow is an aggregation of microflows (or connections). A flow can be composed of different types of microflows (or connections) 110, referred to as "elephants" (high volume, long duration) or "mice" (small volume, short duration).

As described above, to optimize the implementation of an application in the cloud, metrics that characterize the accessible underlying cloud infrastructure are useful. Metrics which characterize the activity generated by the application on this cloud infrastructure are also useful. The flow represents the activity of the application in the underlying network path. In one embodiment, a flow can be characterized at a minimum by its latency and throughput, which are both functions of time. The latency can be defined as an average time it takes for information to go from a source to a destination and back. The relevant unit of measurement is typically the millisecond. The latency metric can be applied to both flow or path objects. The throughput can be defined as a rate at which information can be reliably sent to a destination. Throughput can be expressed in terms of megabits per second (Mb/s) and it is applicable to characterizing the flow.

Other metrics that can be used to characterize a flow are reliability and the number of connections. The number of connections is the number of connections composing a flow. The reliability metric can relate to packets lost and duplicated over time, a percentage of redundant information that have to be sent to recover these errors and congestion events (timeout) over time.

Figure 2:
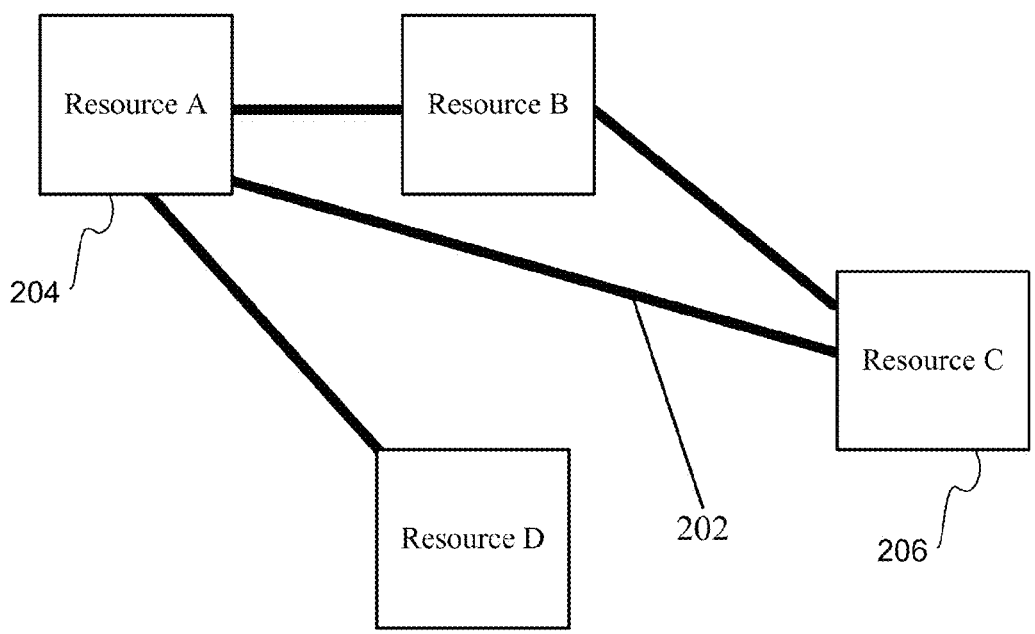
FIG. 2 shows a path connecting two resources in accordance with one embodiment.

A path is the representation of the sequence of network software and hardware components between a source and a destination used to carry flow data between these two points. A path starts at the transport layer of the source and ends at the transport layer of the destination. FIG. 2 shows a path 202 between two resources 204 and 206, e.g., a source and a destination.

In the embodiments described herein, it can be desirable to characterize a path. As described above, a path is defined by its source and destination. In one embodiment, the path may be characterized by its latency and capacity. The bandwidth capacity of the path is the upper bound of the rate at which information can be sent to a destination. It may happen that a flow using a path exceeds the capacity of the path. In this case there is a congestion event and flow packets can be lost. The location where this congestion occurs is referred to as a bottleneck.

Another example of a metric is congestion level. This metric can be used to evaluate the severity of the congestion of a path. The congestion level can be defined on a 0 to 10 scale. Level 0 is used for a network path that is never congested (which never drops packet because of buffer overflow) while a 10 corresponds to a path blocking or dropping almost all packets for more than 1 hour. The congestion level can be defined by the number of drops and the duration of the event. Congestion can be costly. Some studies give numbers, such as $42K cost for one hour of network outage. Path congestion for one hour is considered as an outage.

The path latency can be defined as the average round trip time experienced by a packet forwarded in the path. The minimum path latency is the lower bound of the path latency observed during a period of time. The latency may be expressed in milliseconds. The latency can be represented as a time function or by its statistics (min, max, mean, standard deviation, 90th percentile, 99th percentile).

The capacity can be considered as an upper bound on the amount of information that can be transmitted, stored, or processed by an allocated resource. The capacity can be represented as a time function or by its statistics. For example, the path capacity is expressed in Mb/s. The path capacity is the sum of the available capacity and utilized capacity.

The latency and capacity of a path can vary over time and are not necessarily accessible directly. In particular embodiments, these characteristics can be estimated by active probing or inferred from transported data. The capacity can be represented as a time function or by its statistics.

As described above, flow or a path can start and end in the transport layer of a resource, where TCP is one example of a transport layer that can be utilized. TCP is a transport protocol which has several functions. One TCP function is to send and receive data from/to the application process. A second function is to control the congestion within the network (specifically on the network path used by the connections). In various embodiments, described herein in more detail as follows, both of the functions and variables associated with these functions (TCP variables) can be utilized. In one embodiment, TCP variables of connections between a source and a destination can be used to estimate the flow patterns as well as to detect congestions within a path.

One of the aspects of optimization and resource management may be related to identifying and responding to communication bottlenecks. A bottleneck is a spot of the infrastructure where the activity is perturbed and slowed down. A bottleneck is a problem in the cloud network that is preventing cloud resources from operating at their full capacity. For example, this could be a slow router creating network congestion or an underpowered computing resource that causes an application to slow down.

The capacity of a path is the sum of utilized capacity and available capacity. The utilized capacity is the consumed amount of information that can be transmitted by unit of time, stored or processed by a utilized allocated resource. For a path, the utilized capacity is expressed in Mb/s. The utilized capacity corresponds to the flow throughput. The available capacity is the remaining amount of information that can be transmitted by unit of time, stored or processed by a utilized allocated resource. For a path, the available capacity is expressed in Mb/s. When the available capacity approaches zero, the flow can be considered bottlenecked. When TCP is utilized, the TCP (or TCP-friendly) connections of the flow will be forced to reduce their throughput and may experience congestion events. The congestion may materialize as packet drops and a decrease of the congestion window of the connections of the source.

Figure 3:
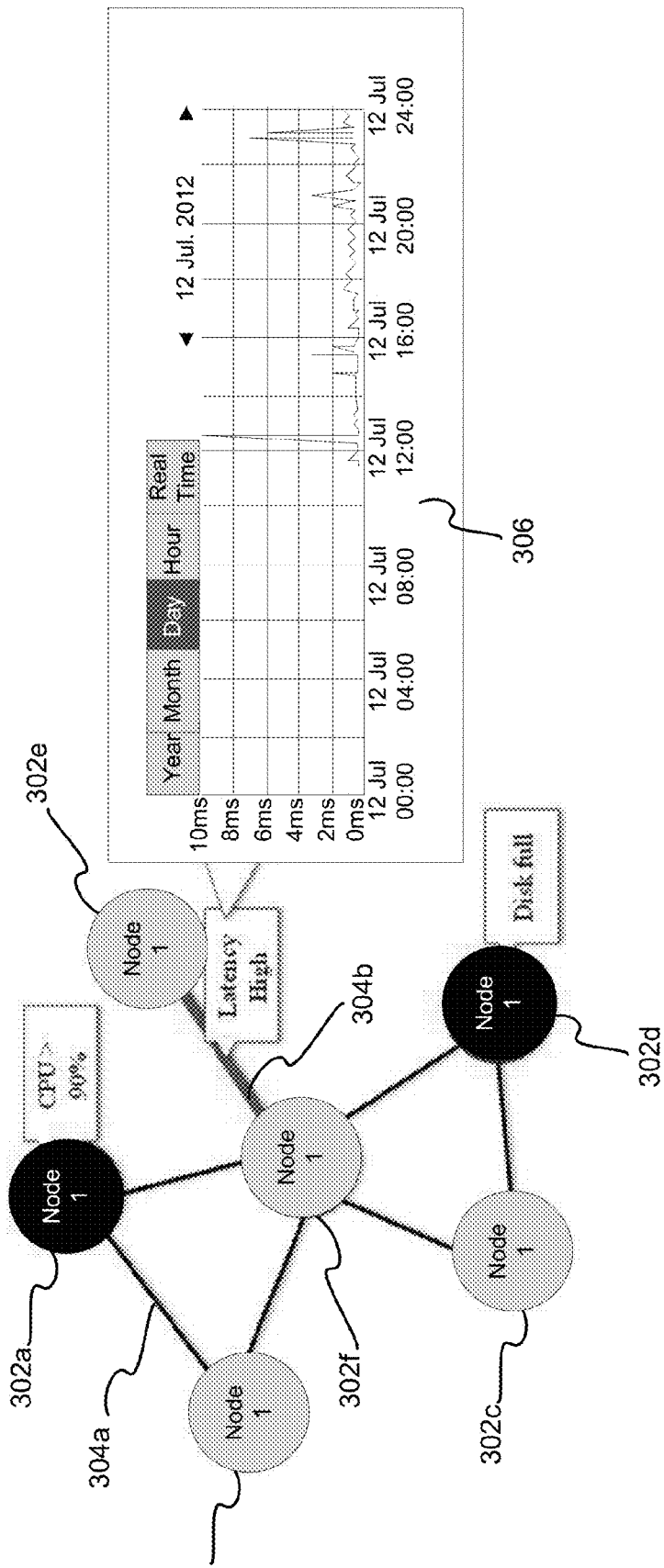
FIG. 3 is a diagrammatic representation of an example flow map in accordance with one embodiment of the present invention.

Once the flows are characterized, a flow map can be generated to visually represent properties of the flow. The visual representation can be geared toward providing information that aids in managing the cloud resources. In one embodiment as shown in FIG. 3, a flow map can be generated to display congestion or bottleneck events. The flow map includes 3 nodes (e.g., 302a-302f) and 7 flows (e.g., 304a and 304b). Two nodes (302a and 302d) and one flow (304b) are high-lighted because of resource issues. Node 302a has a CPU usage greater than 90%. A second node 302d has a disk near capacity. The flow 304b is identified as having a high latency. A resource graph 306 associated with the latency may be displayed to provide additional insight into the latency issue.

In general, the flow map can be configured to display the application graph with flows between nodes. The flows can represent the usage of the network from one virtual resource to another. A flow list generated by a system component, such as the UI can display the activity and corresponding health (time-series (charts) and statistics with user-defined alert thresholds) of each flow. A node list generated by the system can display activity and corresponding health (time-series (charts) and statistics with user-defined alert thresholds) of each node.

A flow map represents a particular grouping of resources and the connections between the resources. In particular embodiments, the connections can be associated to exactly one flow to make sure there is no double-counting. The rules to create flows can be defined using any characteristics associated to connections. The default partitioning may be done using the source and destination IPs of the connections. If connections are not covered by any flows, a warning can be issued to make the user reconsider its partition scheme.

Figure 4:
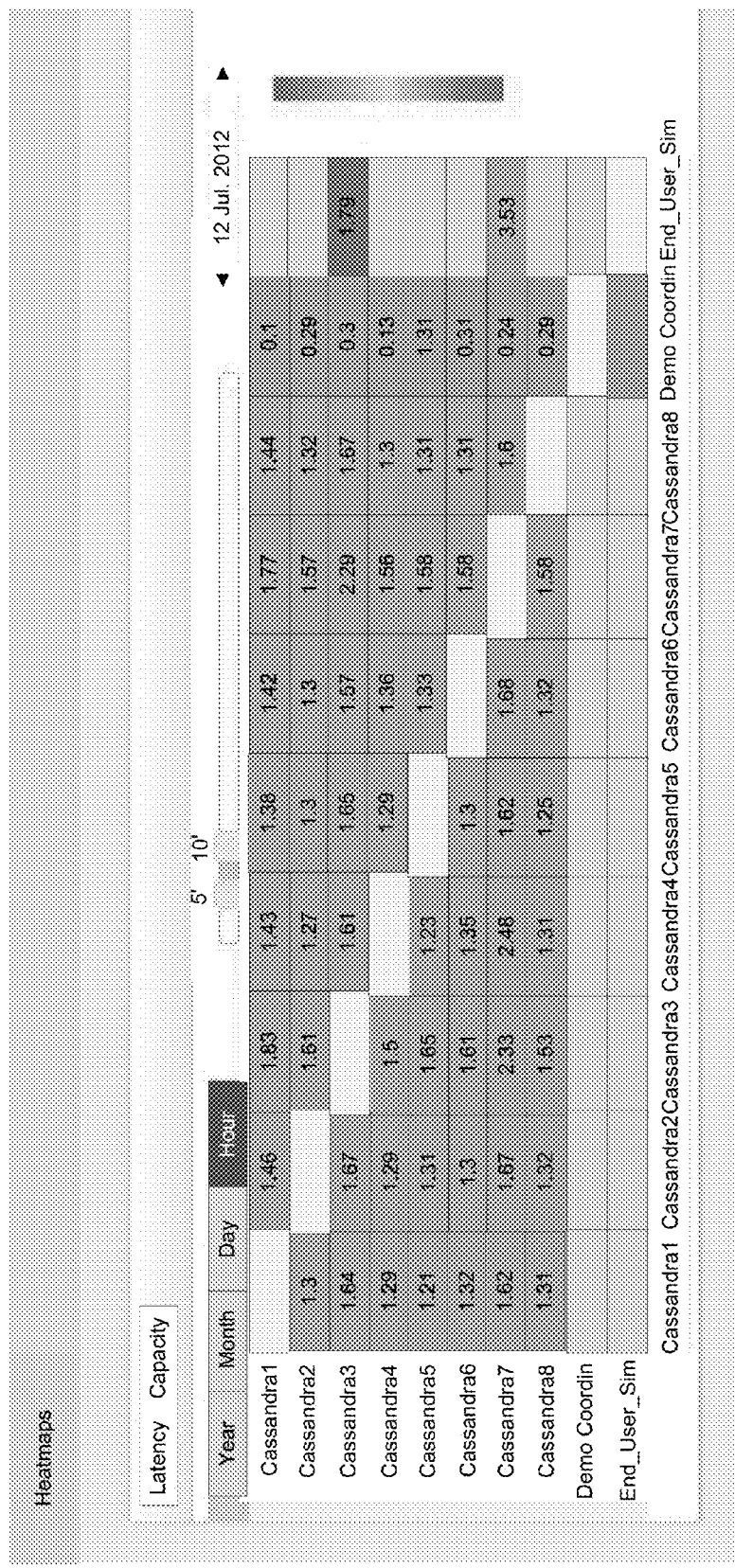
FIG. 4 a is a screen shot from a user interface (UI) including a heat map in accordance with a specific embodiment.

In other embodiments, along with the flow map, the system can generate snap shots and heat maps. A snap shot can display quantities, such as top utilized resources (hotspots & potential bottlenecks), top flows (max throughput, max activity) and top flow latency (highest latency). The flows can be sorted according to these different parameters. A heat map can prove a representation of network performance, where the individual values (latency & available capacity) of the network path matrix are represented by gradual colors. In this matrix, the row and lines corresponding to path with activity, the flow statistics are represented. In the example of FIG. 4, each cell is active, such that a selection of the cell redirects the user to detailed performance information. After selection, the detailed information can be displayed in a pop up window or the system can generate another page that displays the information.

System Overview

In this section, an overview of a system providing tools that allow a user to manage their cloud resource is described. For illustrative purposes, an example topology of customer's resources in the cloud and management of these cloud resources is first described with respect to FIG. 5. Then, a system for implementing the resource management strategy described in FIG. 5 is discussed with respect to FIG. 6.

Referring back to the example of FIG. 2, four resources A~D associated with a user's applications executing in the cloud are shown. In FIG. 5, four flows (Flows 1 and 2 of 506a, Flow 3 of 506c, and Flow 4 of 506d)) have been mapped to the resources in FIG. 2. The resources and the associated flows may have been automatically discovered by the system. For instance, a user may have provided access credentials to the system that enable the system to discover the user's current usage of cloud resources.

Figure 5:
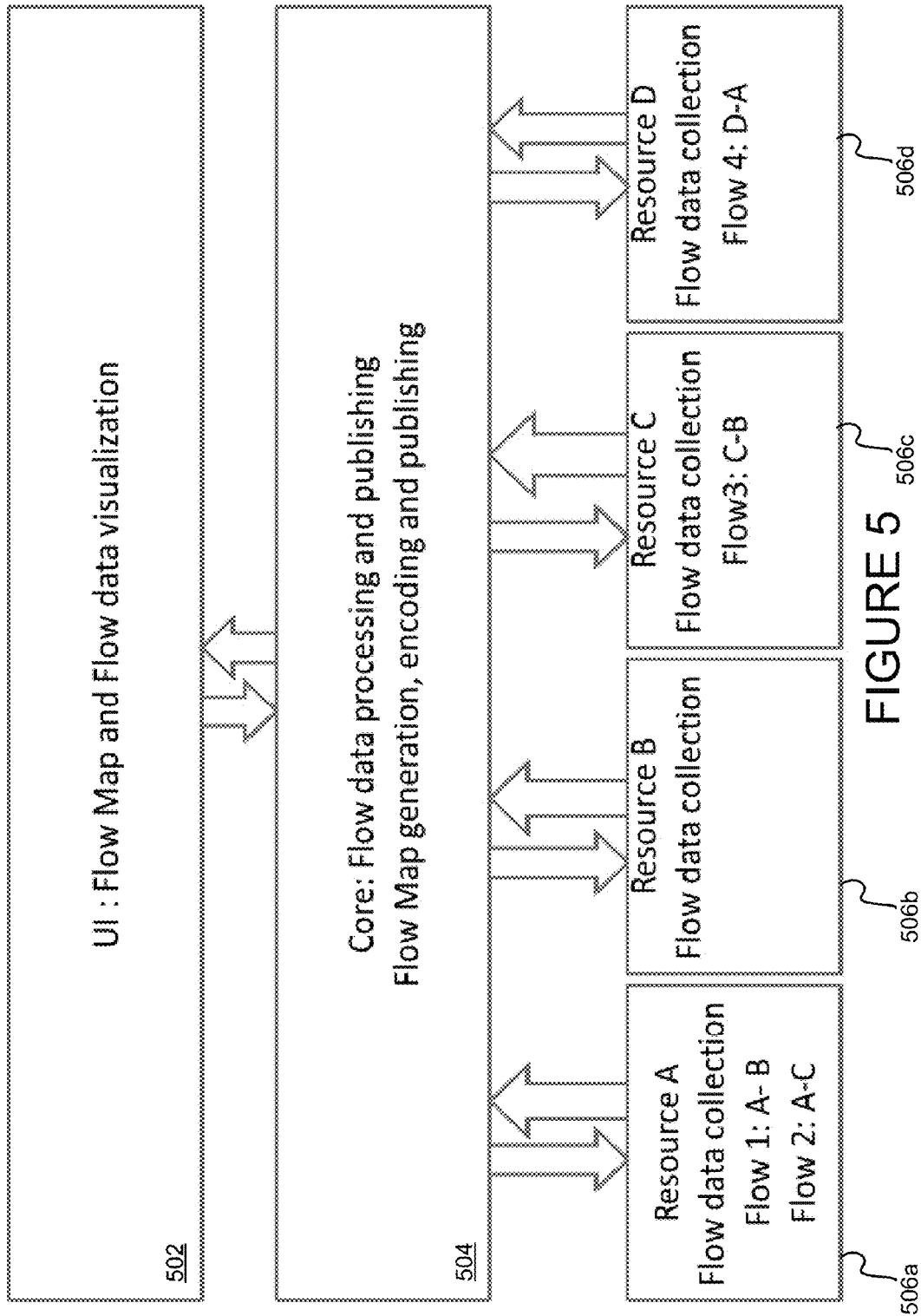
FIG. 5 is diagrammatic representation of an example system that can provide flow characterization and resource management for customer cloud resources in accordance with one embodiment.

With respect to FIG. 5, resource topologies with more or less flows and more or less resources are possible. Further, different flow mappings between resources A, B, C and D including more or less flows is possible. In addition, the number of flows and the number of resources for a particular user can change over time. For example, at a first time the user may utilize four resources, at a second time a user may utilize three resources, and at a third time a user may use six resources. From time to time, some of the flows may remain constant, new flows may be added or existing flows and/or resources may be terminated. Thus, the number of flows and their associated sources and destinations is provided for the purposes of illustration only and is not meant to be limiting.

Returning to the example in FIG. 5, resource A can collect flow data for a first flow between resource A and B and a second flow between A and C as shown by 506*a*. Resource C can collect flow data for a third flow between C and B as shown in 506*c*. Resource D can collect flow data for a fourth flow between D and A as shown in 506*d*. Resource A may have the ability to collect flow data but, in this example, the collected data is not associated with any flows (506*b*). To enable the data collection measurement, software may have been previously downloaded to the resources.

The measurement software on each of the resources can acquire data and send the acquired data to a core 504 for processing. The data acquisition can be an ongoing process, where the measurement software is acquiring at different times. The data acquired over time can be used to characterize resource performance over time. In one embodiment, the measurement software on each resource may acquire data in an asynchronous manner from one another. Thus, the core can be configured to perform operations that involve synchronizing the data received from each of the resources, such that it can be output in a time consistent manner.

Besides processing the data acquired from the resources, the core can be configured to automatically discover the resources for a user, such as resources A, B, C and D, generate a topology of the resources, deploy instrumentation to collect flow data, determine the flows between the resources, process the acquired data to generate path and flow characterization metrics, publish results, and process the flows to generate a network graph of flows. In one embodiment, the results can be published via a UI 502 that provides flow maps and flow data visualization for the various discovered resources. Further, the UI can be used to perform actions that affect the resources.

Figure 6:
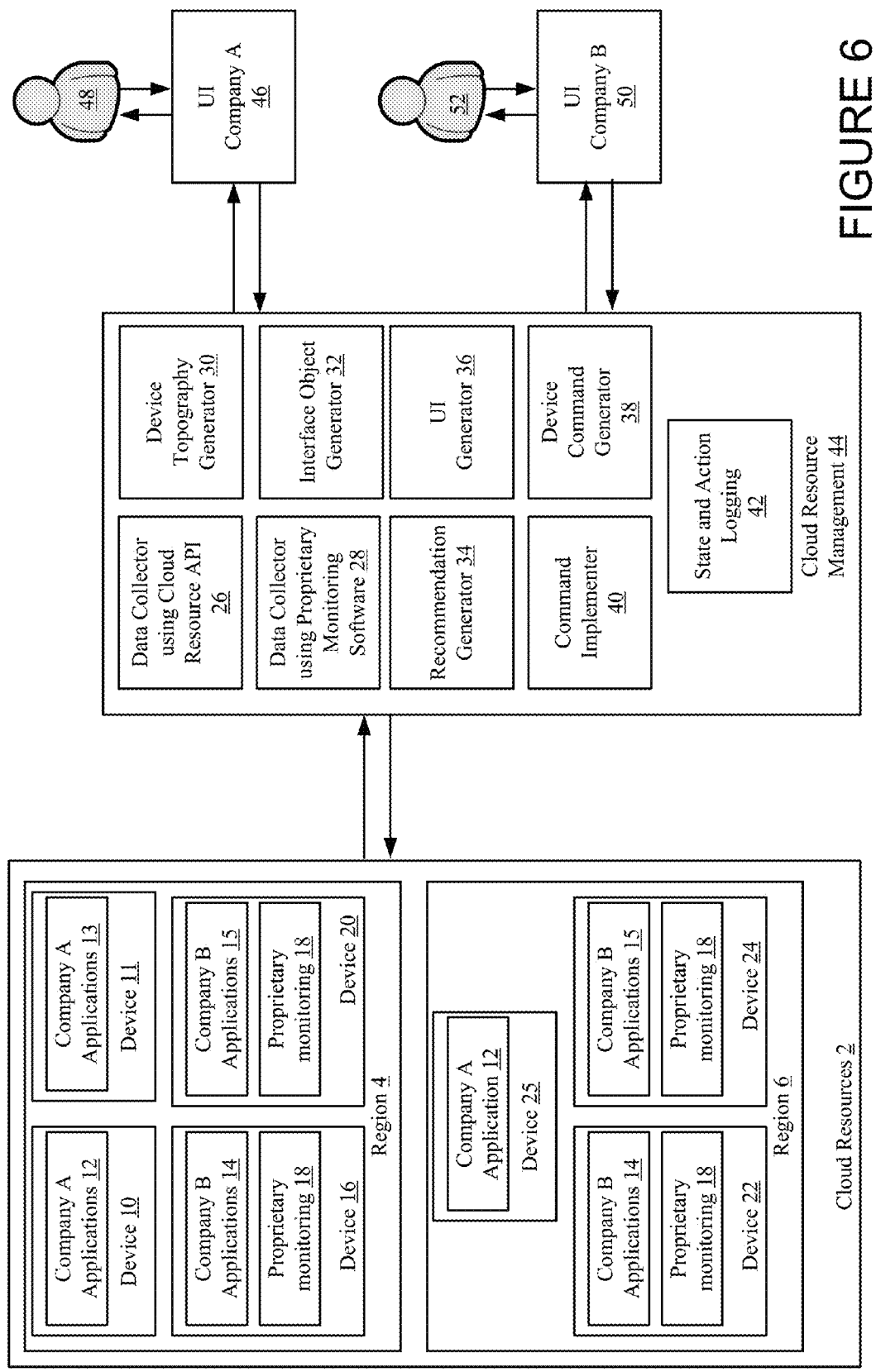
FIG. 6 is a diagrammatic representation of a system providing cloud resource management in accordance with one embodiment.

With respect to FIG. 5, a system configured to perform some of the core and UI functions is described. In FIG. 6, for the purposes of illustration, an example configuration involving resource performance visualization and management for two different companies, company A and company B is discussed. Company A and company B utilize cloud resources 2. Company A and company B may each have a distinct set of customers that utilize the applications provided by each company. Company A and company B are typically unaware of each other's resource utilization in the cloud.

The cloud resources 2 are distributed in two different regions, region 4 and region 6. Typically, regions refer to separate geographic locations, such as resources located in the eastern United States and the western United States or resources located in United States and Europe. The resources are distributed to serve users of the applications in a particular geographic area. The allocation of resources in relation to demand in a particular area affects application performance. Thus, the assessment and visualization of the performance of cloud resources according to region can be important.

In the example of FIG. 6, a first set of applications 12 associated with company A are executing on device 10 in region 4, a second set of applications 13 associated with company A are executing on device 12 in region 4 and a second instantiation of the first set of applications 12 associated with company A are executing on device 25 in region 6. Further, a first set of applications 14 associated with company B are executing on device 16 in region 4, a second set of applications 15 associated with company B are executing on device 20 in region 4, a second instantiation of the first set of applications 14 associated with company B are executing on device 22 in region 6 and a second instantiation of the second set of applications 15 associated with company B are executing on device 24 in region 6. As described above, the devices can refer to logical entities. For example, device 10 can be a single virtual machine or a cluster of virtual machines. In addition, a set of applications executing on a device can include multiple instantiations of one or more applications within the set where the number of instantiations within the set can change over time.

The different sets of applications can communicate with one another to complete a task. For example, the first set of applications 12 for company A on devices 10 and 25 may each communicate with the second set of applications 13 on device 11. As another example, the first instantiation of the first set of applications 14 associated with company B on device 16 can communicate with the first instantiation of the second set of applications 15 associated with company B on device 20 to complete a task. In addition, the second instantiation of the first set of applications 14 associated with company B on device 22 in region 6 can communicate with one or both of the first instantiation of the second set of applications 15 on device 20 in region 4 or the second instantiation of the second set of applications 15 on device 24 in region 6 to complete a task.

In one embodiment, proprietary monitoring software can be deployed. However, its deployment is optional. The proprietary monitoring software can be executed in conjunction with the applications to provide additional measurements that can be used to characterize application performance in the cloud. However, even without the deployment of the software, some useful performance measurements may be obtained using functions that are native to the cloud resource, such as functions available via a cloud resource API (Application Program Interface) or a Network monitoring API. Thus, embodiments with and without the proprietary monitoring software are possible. In the example of FIG. 6, additional monitoring software 18 has been deployed for the applications executed by company B but not for the applications executed by company A.

The applications, the devices on which they execute and the communication patterns form a topology in cloud. The topology may involve two layers. At a higher level, the network topology can be presented as virtual devices and virtual communication paths. At a lower level, the virtual devices and virtual communication paths can be mapped to actual physical devices and physical communication paths. Thus, a mapping exists which translates the virtual representation of the devices and paths at the higher level to the lower level including physical devices and paths.

In a cloud environment to allow for the most efficient use of resources, cloud resource providers do not provide users with a fixed set of physical resources. Instead, the users are provided with access to some amount of physical resources. However, the physical resources that are provided to each user at a particular time can vary. The representation from higher level virtual entities to lower level physical entities helps to enable providing cloud resources as part of a "fee for service" model because it allows some of the physical aspects associated with providing the resources to be hidden from the user.

A very simple analogy is purchasing power. Users of a power grid can agree to purchase a certain amount of power and are provided access to the power. The power can be generated by different power plants at different times, and the user has no control from which power plants they receive power. In addition, the power can be routed by different paths to the user over the electricity grid. Again, the user has no control over how power is routed on the grid. Generally, as long as the user of the power receives reliable power, the user does not care where or how the power is delivered to them.

In traditional networking, to use the analogy above, users often had control of and were responsible for upkeep of the power plants (e.g., servers) and a portion of the electricity grid (e.g., local communications within or between servers). In a cloud environment, this paradigm has changed which provides some advantages but also introduces some new complexities. One such complexity is that unlike power consumption, cloud resource providers have not reached the point where they can reliably provide a guaranteed level of performance under varying demand levels to all of their customers.

If there was sufficient excess computational, memory, and network capacity in the cloud and the cost was low, then cloud resource management would not be such an issue. However, currently, this is not the case in the cloud environment. Thus, tools are needed that help users manage their resource consumption and utilization to respond to changes in the cloud environment that affect the performance of the user's application. If power delivery were less reliable, then one would expect to have tools in the power industry to help users manage their power consumption in a similar manner.

As described in more detail as follows, the system can be configured to discover different sets of applications executing in the cloud including patterns of inter-device communication that the applications utilize, generate metrics as a function of time that characterize that resource performance including inter-device communication, and determine a topology. The performance information can be mapped to the determined topology. The topology and its associated information can be presented in a user interface (UI). Besides the topology, the UI can provide a number of different services for managing the discovered cloud resources in real-time. The topology is determined and visually formatted in the UI to present information in a manner that makes managing the cloud resources simple and intuitive. The topology is also encoded in an XML format so that the user can access in an online or offline manner. VXDL is an example of a virtual network description language that can be expressed in XML.

In FIG. 6, the cloud resource management 44 is configured to provide the functions described in the previous paragraph. Cloud resource management 44 communicates with the cloud resources 2 and generates user interfaces for managing the cloud resources. In this example, the cloud resource management 44 is shown generating two UI's simultaneously, a first one 46 for company A and a second one 50 for company B. The UI's can receive inputs that trigger actions by the cloud resource management 44, such as inputs from user 48 and user 52. The UI's can be presented remotely on company controlled devices.

The cloud resource management 44 can be implemented on one or more electronic devices including processors, memory and network interfaces. Some examples of the functions that can be provided by the cloud resource management 44 are as described as follows. Data collector 26 uses native cloud functions, such as a cloud resource API, to collects data for a resource topography map that can be output in a UI. It can automatically discover a company's resources in the cloud. This function does not require proprietary software deployed to and running on cloud devices. However, if the proprietary software is deployed, data acquired from 26 and the proprietary software can be combined in some manner and then output to a UI.

Data collector 28 receives data from proprietary monitoring software executing in the cloud. In one embodiment, the received data can be used to generate paths and flows that are output to the UI or to an API. Device topography generator 30 generates a device topography map with or without flows depending on the data collected. Different topography representations are possible. Thus, the device topography generator 30 can be configured to generate one or more different topography maps, depending on the representation that is utilized. In one embodiment, the UI may allow a user to select from among group of different topography representations one or more maps to be presented in the UI.

The interface object generator 32 generates and formats data for presentation to the user in a UI. For example, in one embodiment, the interface object generator 32 may generate flow and path objects that are used in a device topology map or a representational flow map. The recommendation generator 34 can be configured to analyze data acquired from the cloud resource and determine actions that may improve the performance of the applications executing in the cloud. The actions can be presented as recommendations in the UIs, such as 46 and 50, where the UI provides mechanisms for allowing a user, such as 48 or 52, to indicate they wish to implement the recommendation. The UI Generator 36 generates and controls a UI that can include recommendations, topography map, and interface objects for each user (e.g., company A and company B). The execution of the recommended workflow of actions can also be automated after some machine learning mechanism has captured the optimal remediation and typical choice of a user in a given scenario.

The device command generator 38 can be configured to generate commands for actions triggered via the UI. Actions in the UI can be presented in a high-level format. For example, a user may indicate they wish to move an execution of an application from a first virtual machine to a second virtual machine by dragging a symbol associated with the application from the first virtual machine and placing it in the second virtual machine using a cursor or some other control mechanism. In response to this action, the device command generator 38 can generate a sequence of low-level commands to implement the action on the two devices. For instance, commands can be generated by the UI that cause the first virtual machine to shut down a resource running application and cause a new instantiation of the resource with the application running to be generated on the second virtual machine. The action can also involve moving the entire virtual machine from one network to one another with less congestion.

The command implementer 40 communicates with specific devices to implement commands determined from the device command generator 38. The command implementer 40 can be configured to communicate with the affected resources and keep track of whether the action has been successfully completed or not. The state and action logging 42 can be configured to log actions that are implemented, such as actions triggered from inputs received via the UI. Further, the state and action logging 42 can be configured to saves snap shots of a topology maps showing a state of user resources at various times. For example, the snap shots can be taken before and after a user implements one or more actions via the UI. Then, the snap shots can be shown side by side in the interface to allow the user to visually assess whether the actions had their intended effect. The evolution of the infrastructure state associated to the sequence of actions that are selected to improve the performance can be captured and encoded to reinforce the machine learning system. A model based on a dynamic graph can be used. The main attributes of this graph can be encoded in a computing language so an application can program its adaptation to the infrastructure in advance and the actions be executed automatically when conditions appear.

The various aspects, embodiments, implementations or features of the described embodiments can be used separately or in any combination. Various aspects of the described embodiments can be implemented by software, hardware, or a combination of hardware and software. The computer readable medium, on which software for implementing various embodiments may be stored, may be any data storage device that can store data which can thereafter be read by a computer system. Examples of the computer readable medium include read-only memory, random-access memory, CD-ROMs, DVDs, flash memory, memory sticks, magnetic tape, and optical data storage devices. The computer readable medium can also be distributed over network-coupled computer systems so that the computer readable code is stored and executed in a distributed fashion.

As the number of nodes increases in a system, visualizing system performance becomes more complex. In one embodiment, to simplify the visualization of system performance, nodes can be assembled into groups. Then, the performance of individual nodes and groups of nodes can be characterized. Within the cloud resource management 44, tools, such as 60, can be provided for initially grouping nodes and then determining a node group in which to place a new node. The UI generator 36 can be used to visual the performance of groups of nodes, such as a flow between two different node groups. Details of methods and apparatus for node grouping are described in the following section.

Node Grouping

In this section, methods and apparatus which enable the grouping of nodes and visualizing the performance of grouped nodes are described. In particular, details of a user interface that enables a user to i) manually group nodes, ii) specify parameters which allow the system to automatically group nodes and iii) view performance characteristics associated with grouped nodes, such as flows between the group nodes and heat maps, are discussed. In addition, details of a method, including a machine learning algorithm, which generates an initial grouping of nodes from a set of ungrouped nodes and then each time a new node is added generates a recommendation of a node grouping in which to place the newly added node, is discussed.

A user's collection of cloud resources can be viewed as a number of nodes. It is possible to specify and utilize other entities and a node is provided for the purposes of illustration only and is not meant to be limiting. Tools that enable grouping nodes can make it easier to scale the UX (User Experience) to medium and large deployments (e.g., >twenty nodes), including applying widgets to the node groups, such as flow mapping between node groups, as opposed to just between individual nodes. Further, tools which enable the grouping of nodes can allow users to filter by groups, which may allow the user to find items of interest more quickly. Also, the tools which enable node grouping may allow each user to construct an interface used to manage their infrastructure in way which is most intuitive according to their individual preferences. An interface constructed in this manner may allow a user to make better, quicker and easier actionable decisions regarding their infrastructure.

Figure 23A:
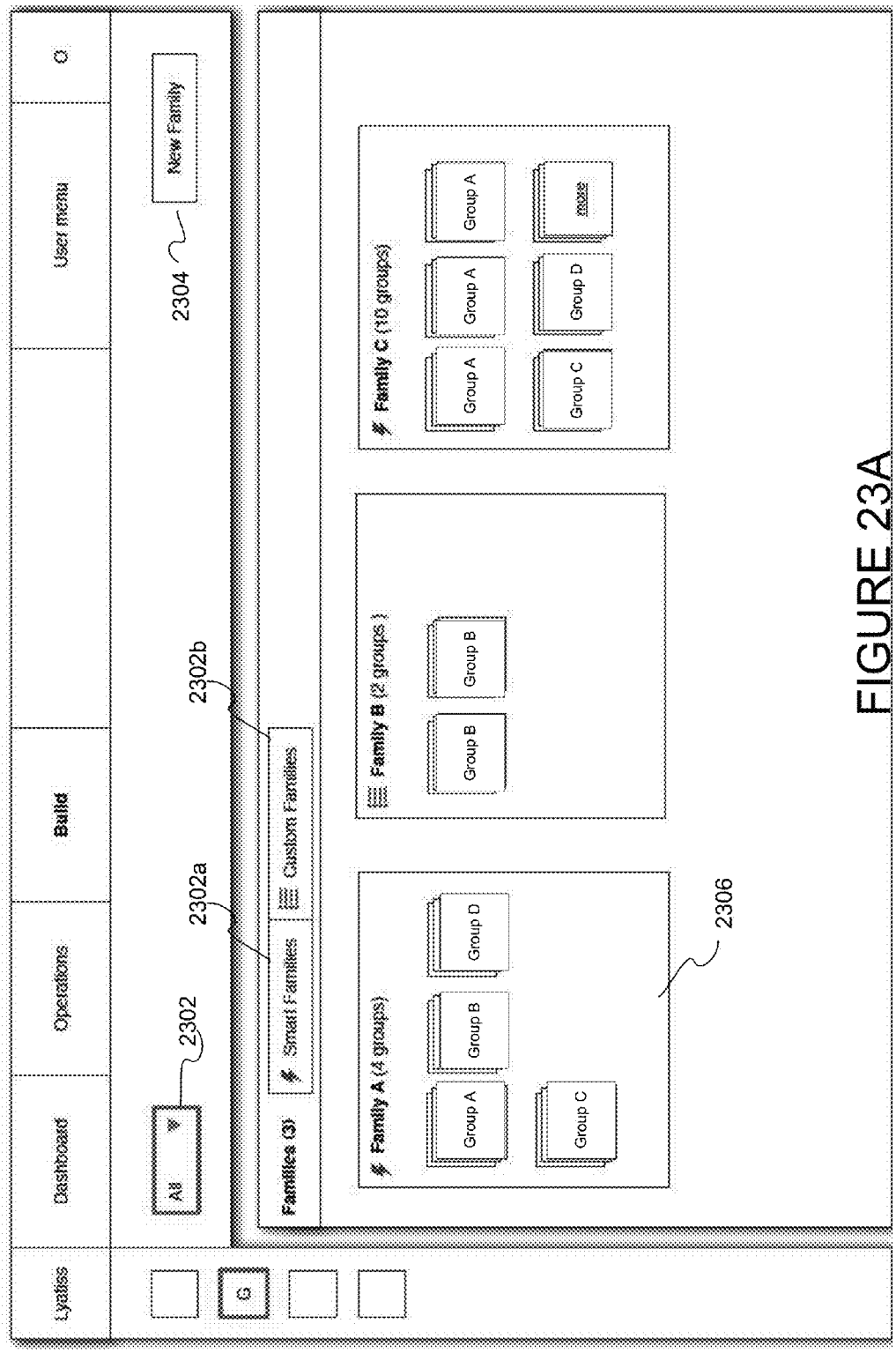
FIGS. 23A-O show UI interface states related to node grouping in accordance with additional example implementations of the present invention.
Figure 23B:
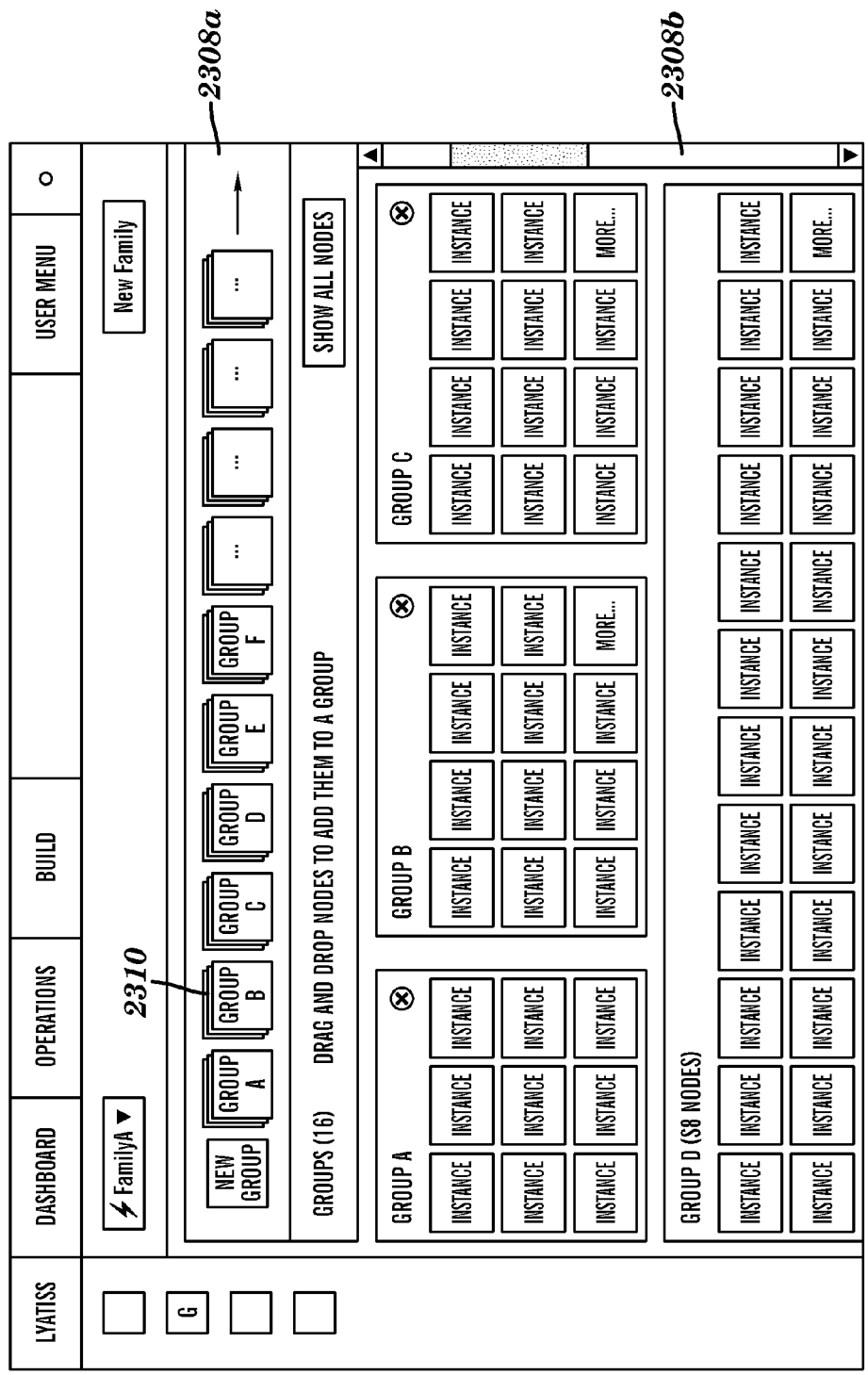
Figure 23C:
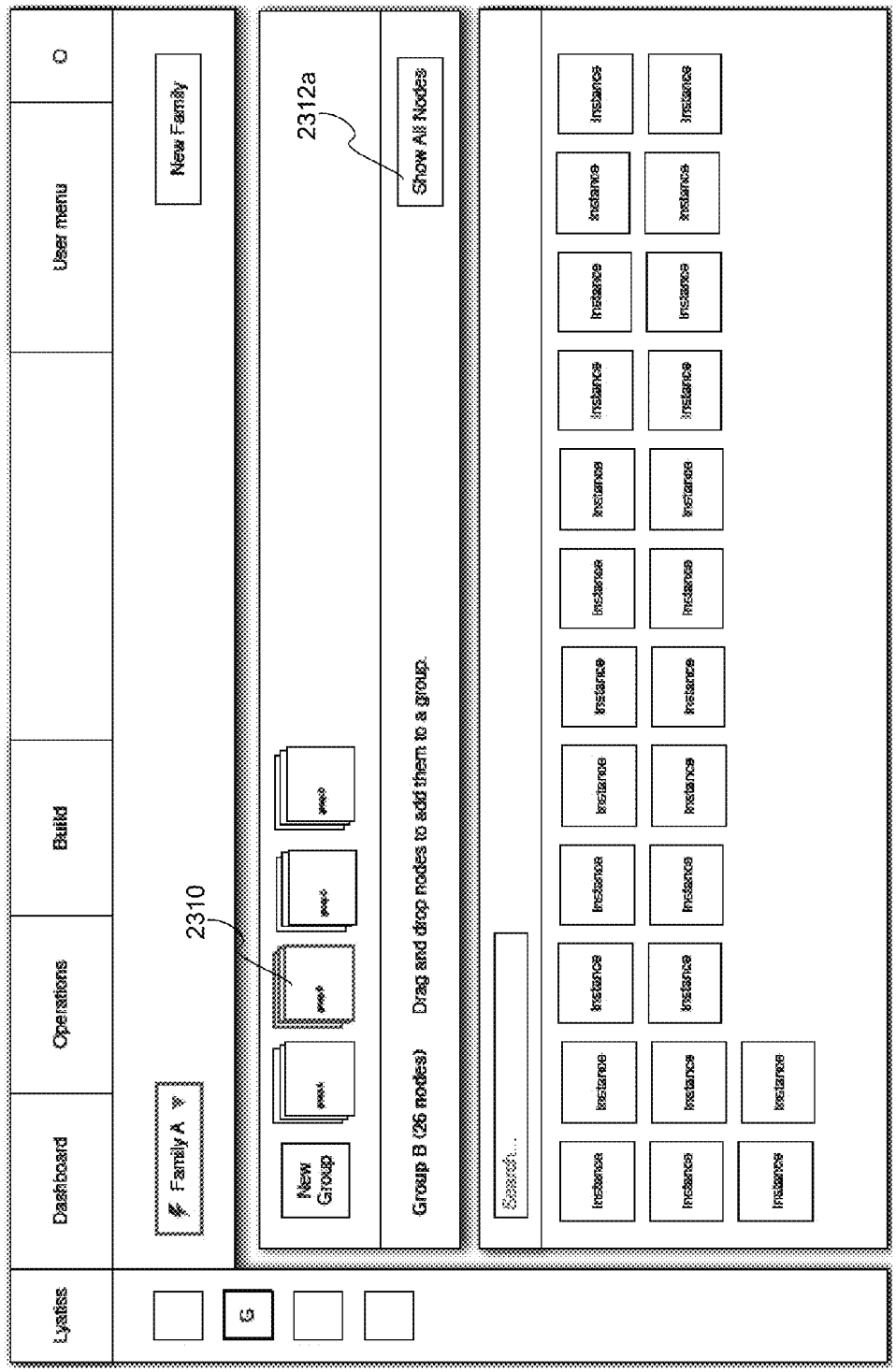
Figure 23D:
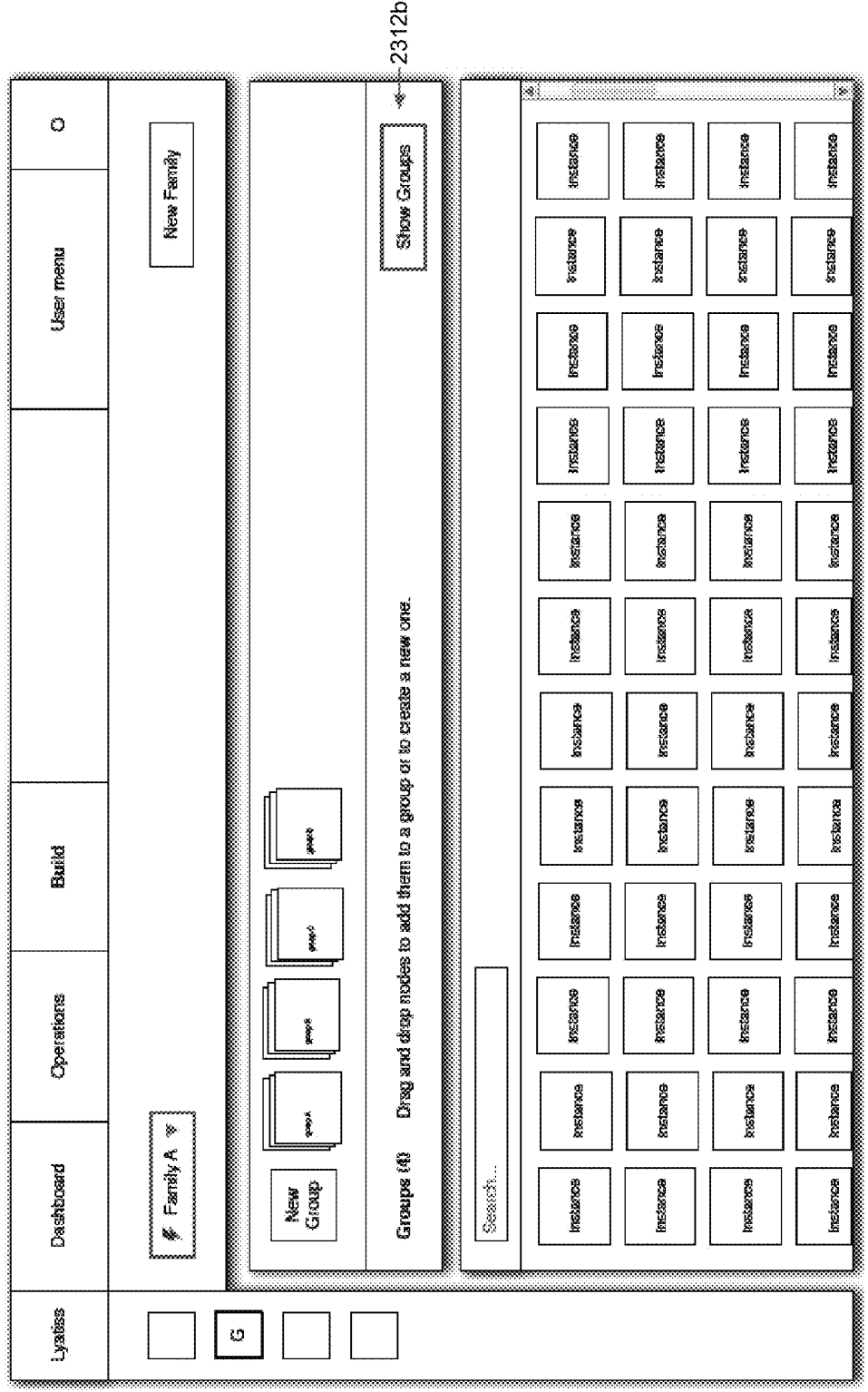

As follows, an overview of a node grouping methodology is described with respect to FIG. 7. Then, a few terms used in the description of the grouping methodology are specified. Next, additional details of an UI which includes node groups and tools for manipulating node groups is described with respect to FIGS. 8-22. Additional examples of interface states associated with the UI are shown in FIGS. 23A-O. Finally, methodology associated with grouping nodes is described with respect to these figures.

Figure 7:
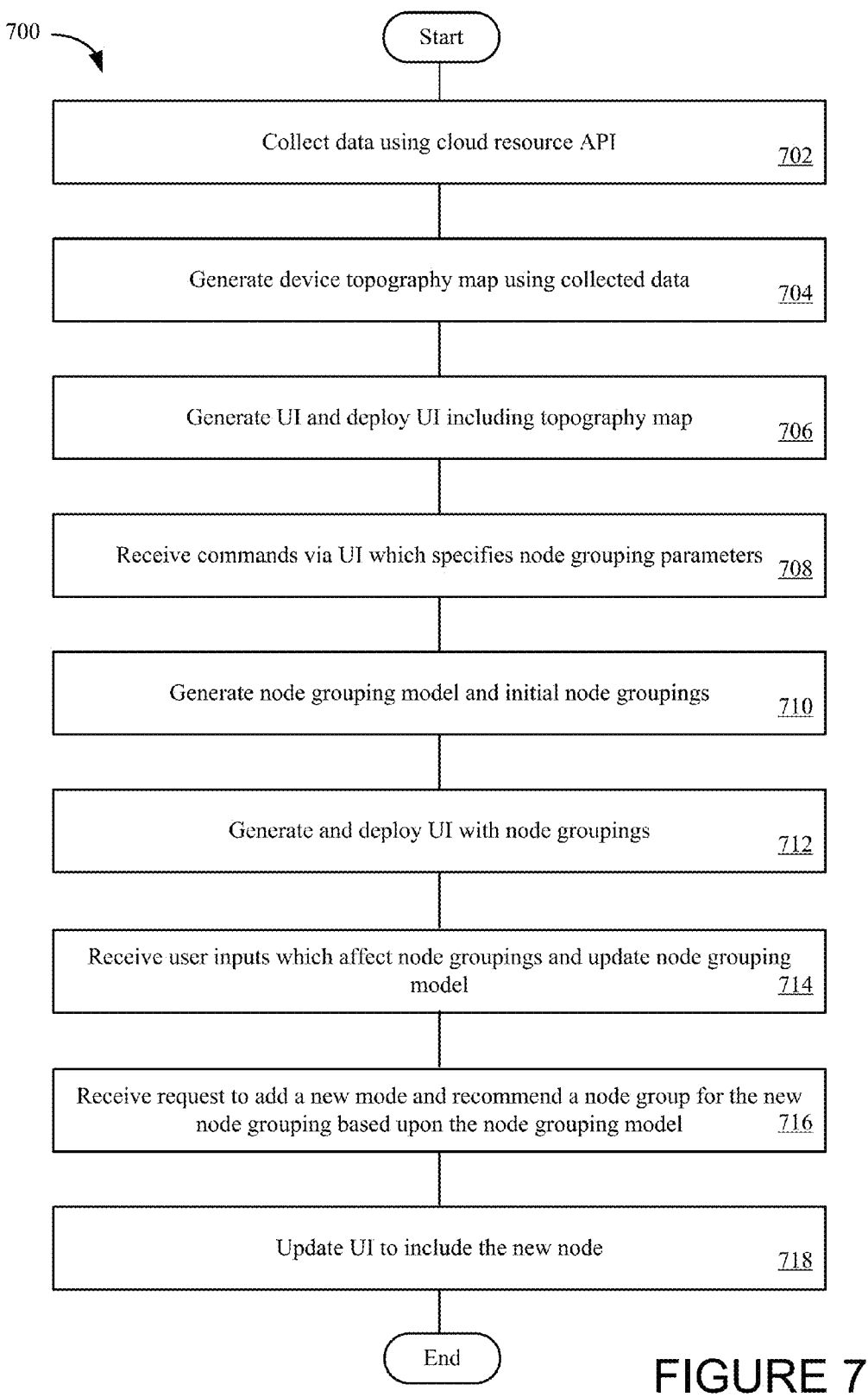
FIG. 7 is a flow chart of a method associated with grouping nodes in accordance with one embodiment of the present invention.

FIG. 7 is a flow chart of a method associated with grouping nodes. In 702, the system can be configured to collect data associated with a user's collection of cloud resources. For example, the user can provide access credentials which allow the system to collect data associated with a user's resources in the Amazon Web Services™ (AWS) cloud infrastructure.

In another embodiment, sensors can be deployed with a user's collection of resources that discover their environment. The sensors can be used to collect data without using the cloud provider's API (application program interface). Thus, the same information can be obtained within physical or virtualized (cloud as service) environments.

The collected data can reveal a user's nodes and the connection between nodes in the cloud environment. Based upon the collected data, a topography map of the user's infrastructure can be generated. In one embodiment, the topography map can show multiple nodes and their associated communicating connections. For example, a first node can be shown to be communicating with a second and third node. In 706, a graphical user interface (UI) can be generated and deployed such that the UI includes information about various nodes.

In 708, in one embodiment, the system can receive parameters which are used to generate node groups. The node groups which are generated can vary depending on the input parameters. In 710, the system can generate a node grouping model based upon the input parameters and generate initial node groupings so that each node group is populated with one or more nodes. In alternate embodiments, the system can receive inputs via the UI which are used to create a node group and populate the node group with one or more nodes. In yet another embodiment, the node groups including the nodes in each node group can be specified in a data file and the system can be configured to read information from the data file and generate the new nodes groups.

In 712, an UI including the recommended node groupings from 710 can be generated. In 714, the user can accept and/or modify the node groupings suggested by the system. In response, to any user changes, the node grouping model can be updated. The system can be configured to generate performance information at the node group level, such as flows between node groups and output the information. As described above, the UI can also be configured to output performance information, such as flows between nodes.

In 716, the system, such as via the UI, can receive a request to add a new node. In response, based upon the current node grouping model, the system can be configured to recommend a node group for the new node. The user may accept the recommended node group or specify a different node group for the new node. In 718, the UI can be updated to include the new node and the node grouping model can be updated to reflect the addition of the new node.

Next, an UI state involving node grouping and some terms used to discuss node grouping are described. The system can discover different entities in a cloud environment. In the case of grouping, two examples of entities that can be grouped are nodes and flows. With the system, a user can group these entities into node groups and flow groups. Node groups and flow groups can both belong to a group family. Via the UI, a user can create one or more group families.

For each family, a user can select which characteristics of the nodes that are used to form a group. A number of functional constraints can be specified for groups and families. In particular embodiments, one family can contain an unlimited number of groups, instances cannot be shared between groups of the same family, instances can be shared between groups of different families, and groups can contain unlimited amount of instances.

In one embodiment, a node can be single instance (server) in an Amazon Web Service (AWS) or some other network infrastructure. Some characteristics of nodes which can be used to form groups include, but are not limited, to security groups, instance tags, load balancer, key, or auto scaling groups. Security groups can be a set of rules constraining communication and access to a node. A node can belong to one or more security groups. In the AWS, an instance tag can be set by a user to identify nodes. A node can have one or more tags.

A node can be connected to one or several load balancers. A key pair can be the .pem key that serves to SSH into a node. A node may have only one key pair. Auto scaling groups can automatically scale the number of nodes up and down according to a set of conditions, to meet demand spikes or lulls. A node can belong to one or more auto scaling groups.

A flow, described in more detail above, can be the network connection between two nodes, such as two nodes in the AWS. Characteristics of a flow can be that it has a sender, and a receiver—both of which are nodes. A node group can be a collection of nodes. Conditions for two nodes to be in the same node can be that the nodes have similar values for one or more specified characteristics (e.g., security groups, instance tags, etc.).

A flow group can be a collection of flows. In one embodiment, flow groups can be formed based upon node groups. As example, conditions for two flows to be in the same flow group can be the senders of the two flows are in a first node group and the receivers of the two flows are in a second node group. More than two flows can be in the same flow group and the example is provided for illustration purposes only.

A group family can be a collection of node groups and flow groups. In one embodiment, a user can select what characteristics that are used to group, from among the following node characteristics: i) security groups, ii) instance tags, iii) load balancers, iv) key air and v) auto scaling groups. Based on the selected characteristics, the nodes that have similar values will be grouped together. As an example, three nodes with particular characteristics are described as follows:

Node 1
    Tag: Name=node.test.1
    Tag: color=blue
    Security Group=SG1
    Load Balancer=LB1
    Auto Scaling Group=ASG1
    Key Pair=KP1
Node 2
    Tag: name=node.test.2
    Tag: color=blue
    Security Group=SG1
    Load Balancer=LB1
    Auto Scaling Group=ASG1
    Key Pair=KP1
Node 3
    Tag: name=lyatiss.node
    Tag: color=blue
    Security Group=SG1
    Load Balancer=LB1
    Auto Scaling Group=ASG1
    Key Pair=KP1

The node grouping which might be created is two groups, wherein group 1 includes Node 1 and Node 2 and where Group 2 includes Node 3. The system may generate this grouping because the two first nodes have similar names (node.test.1 and node.test.2 only differ by one character), whereas the third node has a very different name (lyatiss.node). This example is predicated based upon the tag name being specified for grouping. When tag name is not specified as a grouping characteristic, the three nodes are indistinguishable.

FIG. 8 shows some examples of forming grouping families. In the example of FIG. 8, nodes are sorted into family groups by applications, architecture, OS and teams. Different categories can be utilized and these are provided for the purposes of illustration only.

Figure 9:
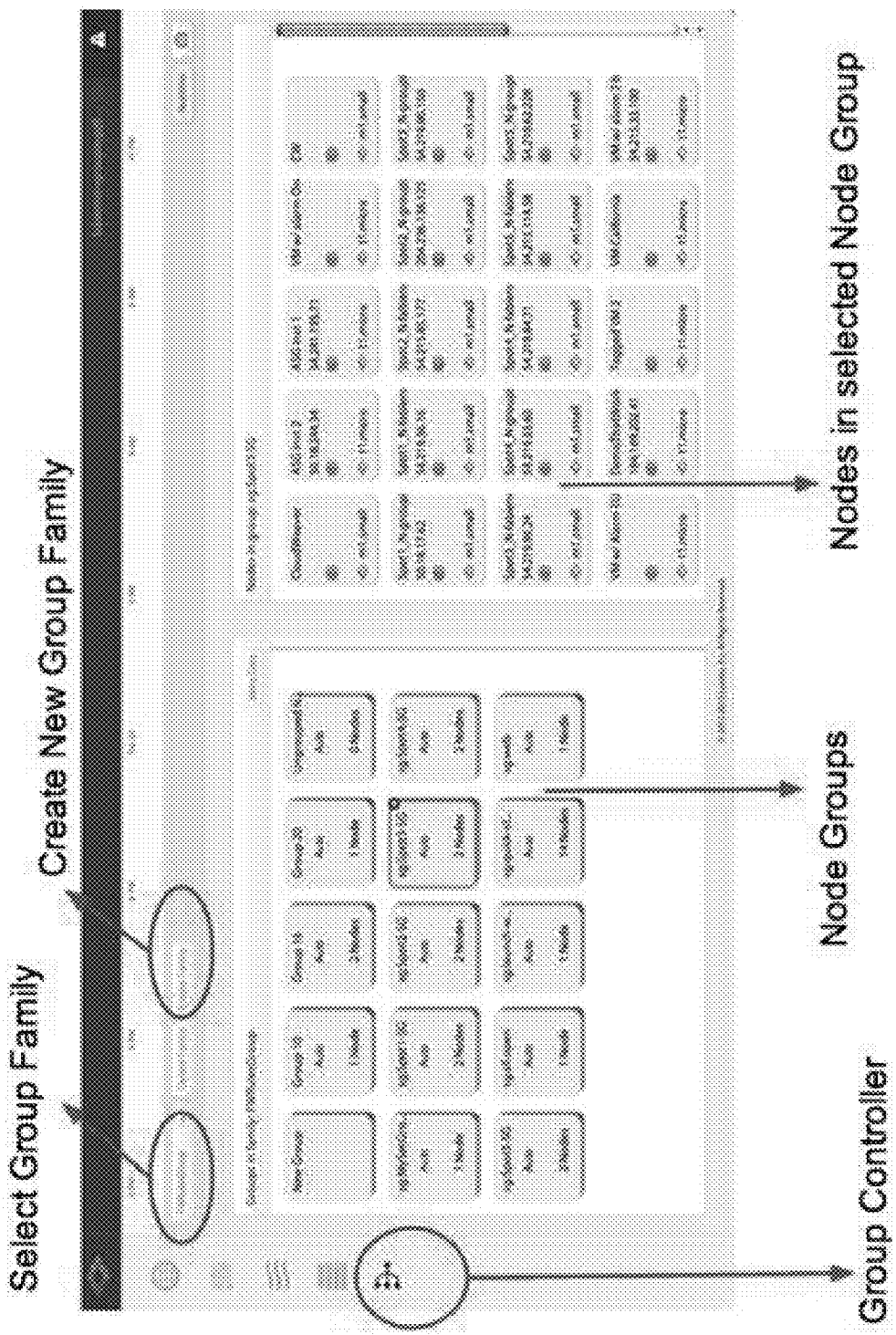
FIG. 9 shows an interface state in which a user can select a group family, create a new family view the groups in a group family, and view the nodes in a group in accordance with one embodiment.

Next, some details of a UI are described. FIG. 9 shows an interface state in which a user can select a group family, create a new family view the groups in a group family, and view the nodes in a group.

In one embodiment, groups can be viewed on widget pages. For example, the system can include widget pages for a node list, flow list, heatmaps, flow map and network topology map. For each widget, nodes can be organized per group, so that they are easier to visualize. The system can also be configured to allow a user to filter what nodes are displayed in each widget by selecting which group(s) to display.

Figure 10A:
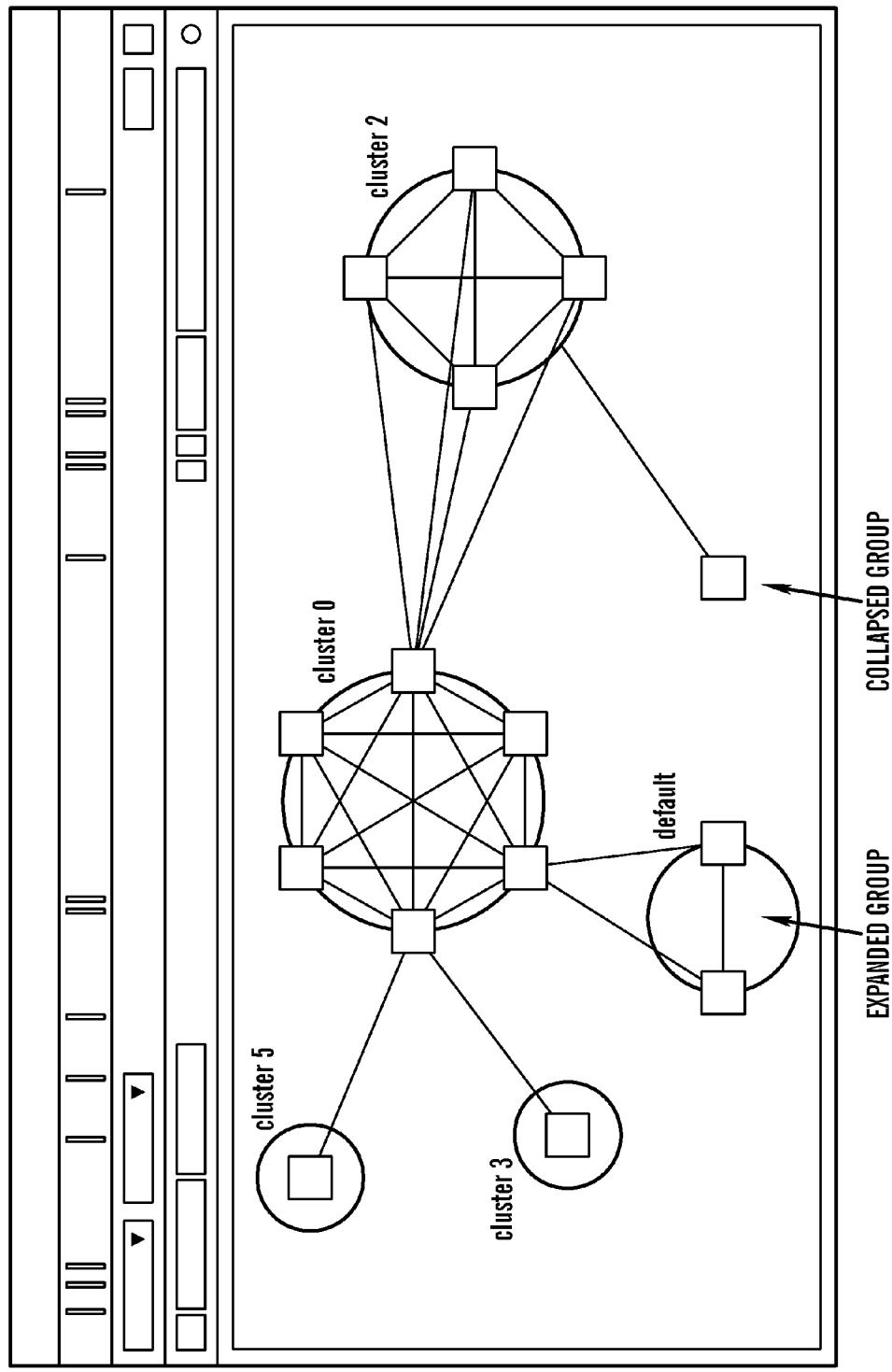
FIG. 10A shows an example of a widget page showing flows.
Figure 10B:
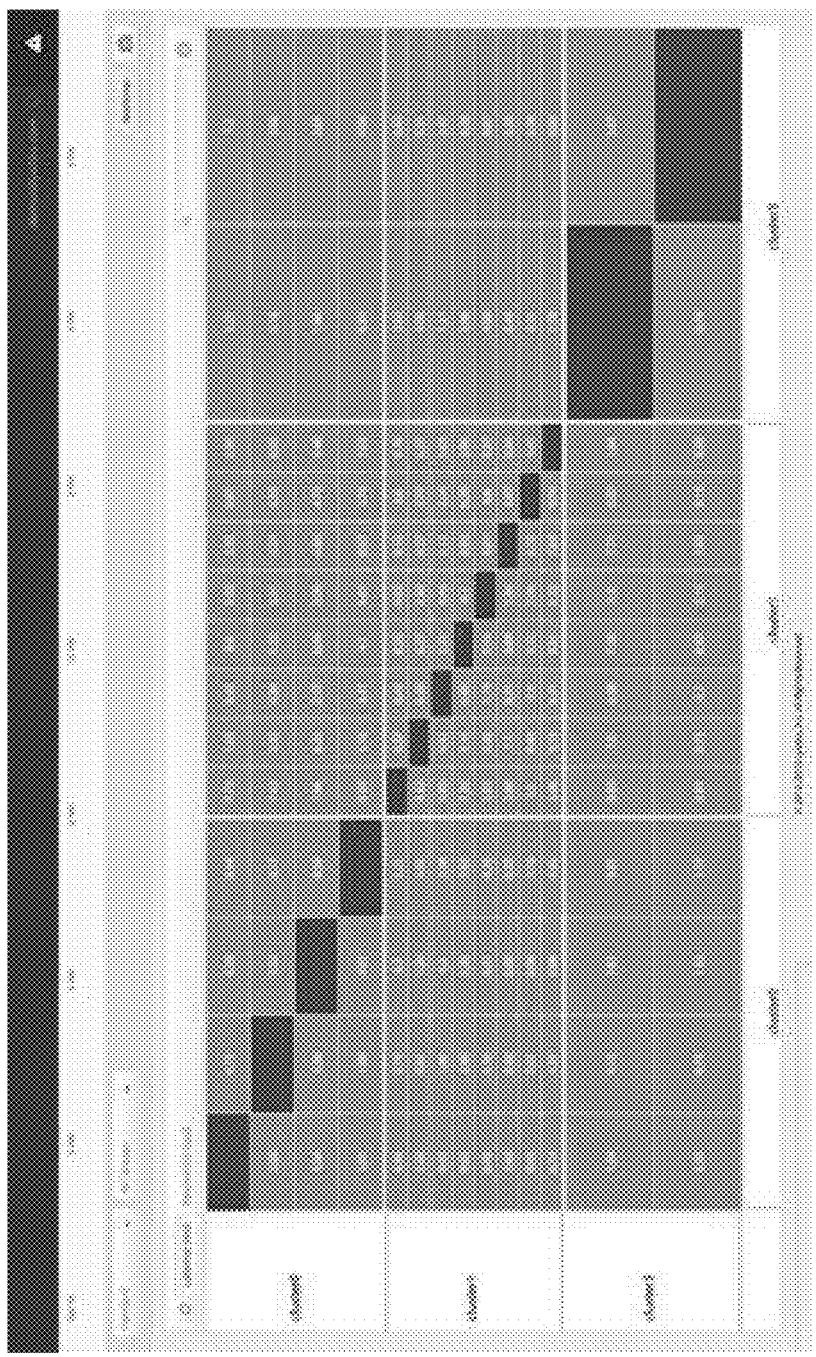
FIG. 10B shows another example of a widget page showing heatmaps.
Figure 13:
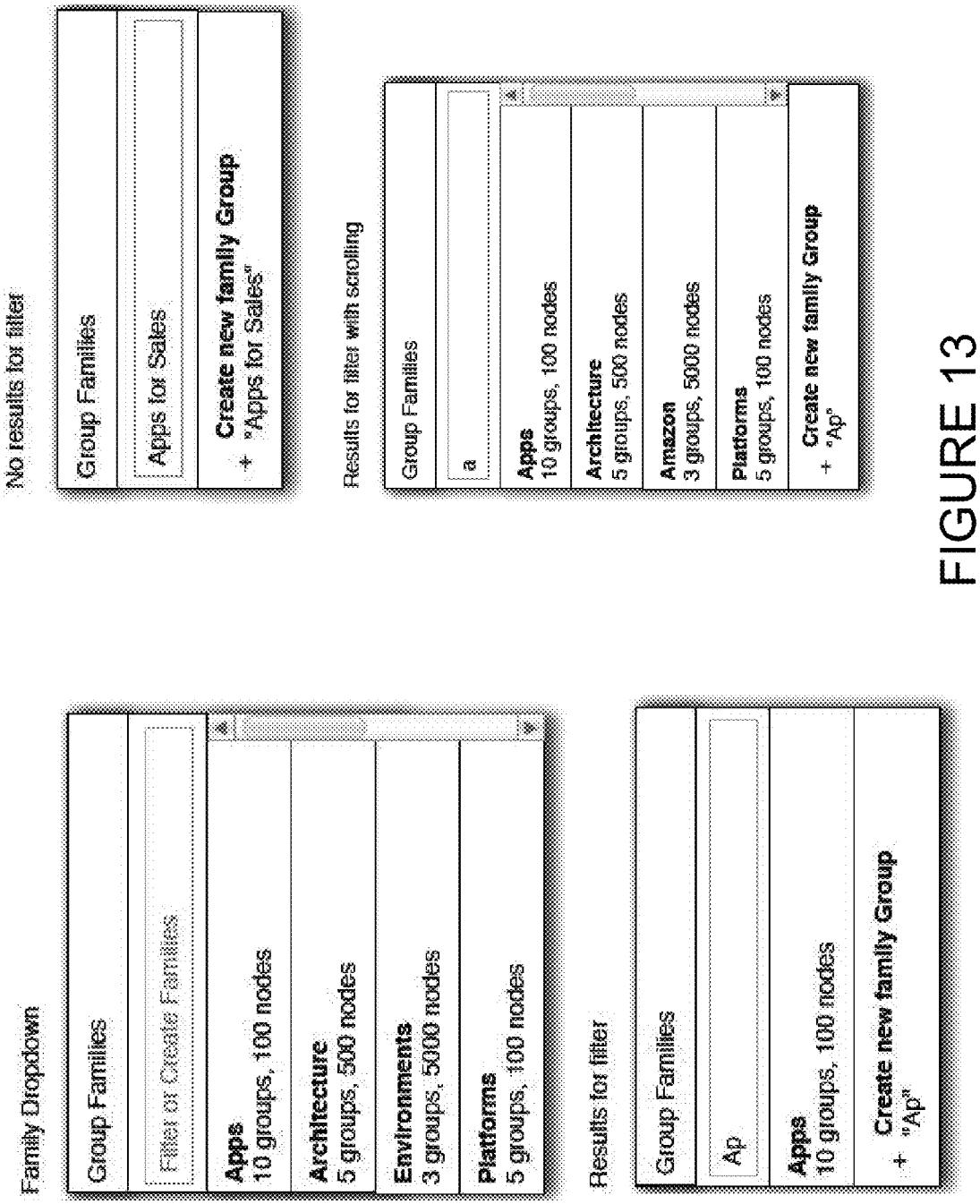
FIG. 13 shows filtering options according to family groups in accordance with an example implementation.
Figure 14:
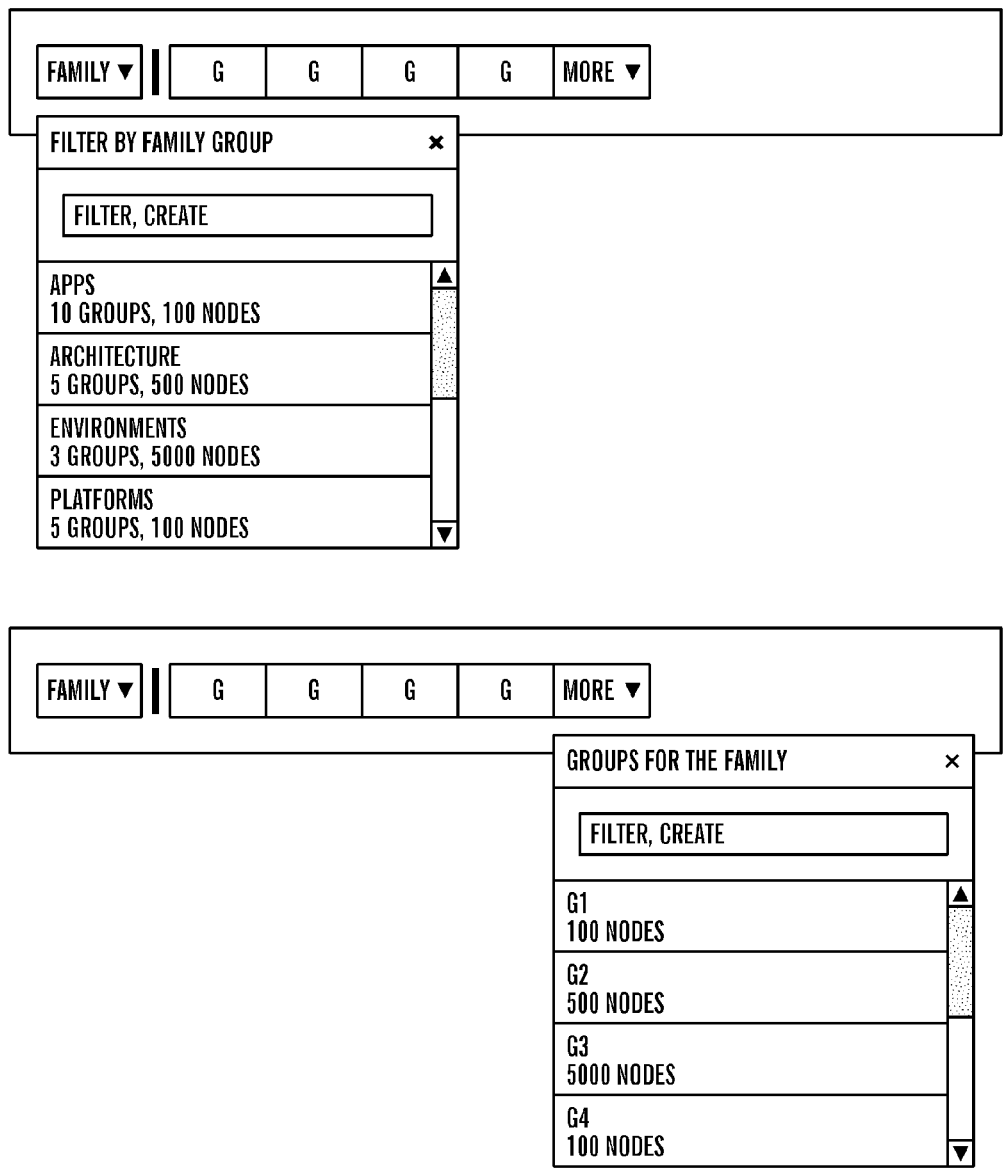
FIG. 14 illustrates filtering by family groups in the global group controller using drop down menus in accordance with one embodiment.

FIG. 10A shows an example of a widget page showing flows. A number of different groups are shown on the page. In one embodiment, groups are selected such that the groups can be expanded or collapsed. In the Figure, some groups are shown as expanded such that the nodes within the group are visible, while other groups are shown in a collapsed format. FIG. 10B shows an example of a widget page showing heatmaps. Further details of the heatmap are described below.

In one embodiment, a global group controller can be provided within the UI. A group controller icon is shown in FIG. 9. In one embodiment, a group controller can be provided to filter nodes in different widgets, such as charts, flow map, heatmaps, reports and network topology map. To use the group controller, groups may need to be defined. The system can be configured to support different types of groups, such as custom groups which are created manually and updated manually and smart groups that can be edited manually and updated manually. Smart groups can refer to automation of some aspect of the grouping process. Custom groups can refer to a manual aspect of the grouping process, i.e., based upon inputs provided by a user.

FIGS. 11 and 12 show a small and large version of a global group controller. The small version may be used when the space on a page is limited. It also may be selectable as a user preference.

Not all the groups may be displayed on the group controller at the same time. For example, if there are too many groups and not enough space on the widget page, then only a portion of the groups may be displayed. In one embodiment, the system is configured to displays all groups if (groups_count*one_group_block_width)<groups_block_width.

The groups can be displayed in a particular order. If there are some statistics for the most viewed groups, then these groups can be displayed first. For the example of FIG. 11, Groups A~D are displayed as the most viewed groups. If there are no statistics, then the groups can be displayed in alphabetical order. Other ordering schemes are possible and these are provided for the purposes of illustration only. For example, groups with alerts can be displayed first.

The global group controller can include a smart dropdown list with a number of options, such as create new family, manage group/family button that links to the group manager and make the group a favorite. The example of FIG. 12 shows a Family Dropdown button 1202 for selecting a particular family or all families to be displayed, as well as a Group Dropdown button 1204 for selecting a particular group or all groups for displaying. In one embodiment, multiple groups may be selected via the Group Dropdown button 1204 (e.g., the pulldown menu is persisted so the user can select multiple groups until the users clicks out of the pulldown menu). Example filtering results are shown in FIG. 23F. Other filtering options are available for drop down menus. These are shown FIGS. 13 and 14.

Figure 15:
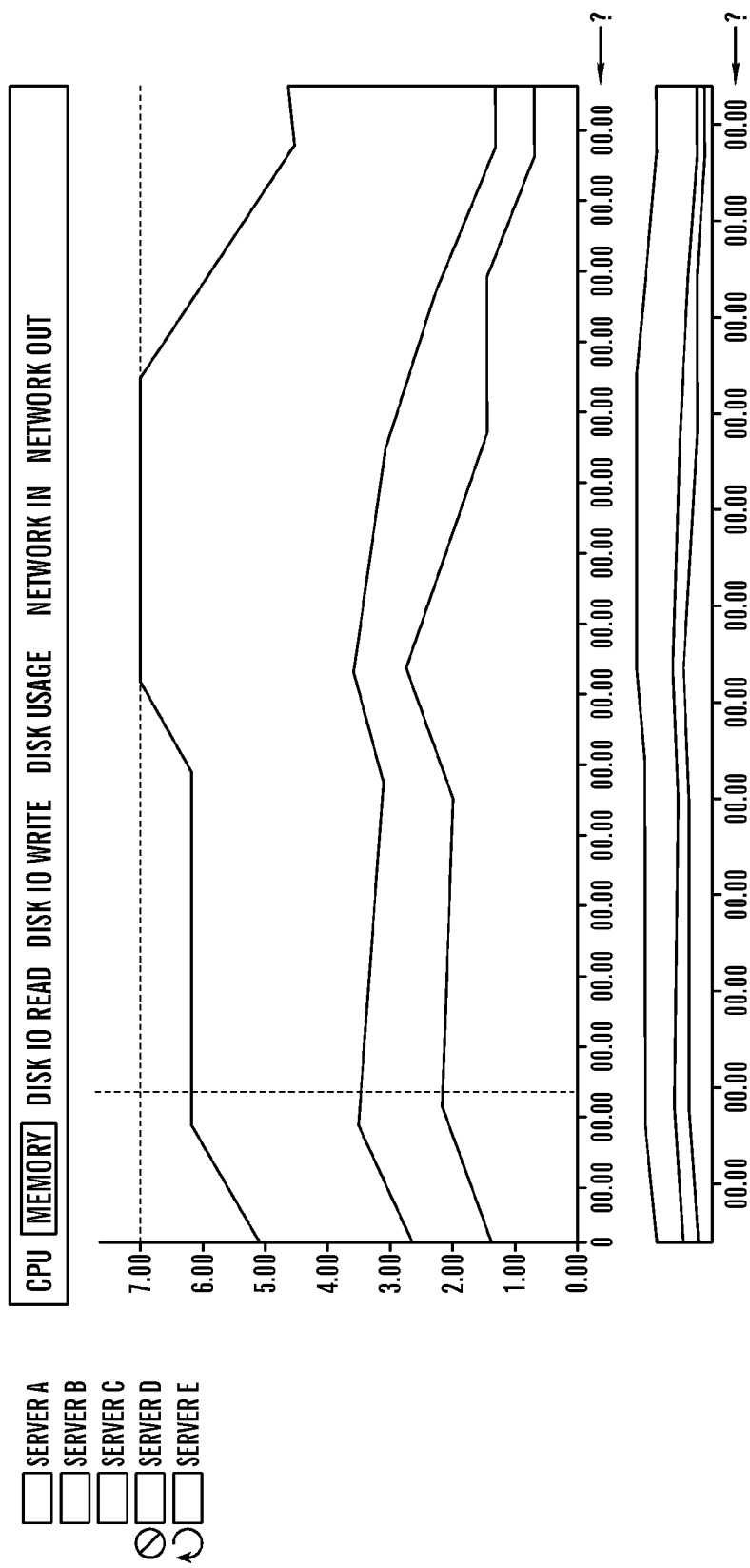
FIG. 15 is a chart for a group associated with an alarm in accordance with one implementation of the present invention.

In one embodiment, groups can be provided for alarms and charts. A group alarm can be raised when there is at least one alarm raised in the group. Smart groups and custom groups can be used to display imbalance charts. When the user selects a group and a metric, the system can display a cumulative diagram for the selected metric. In one embodiment, the metric can be shown on the same chart with all the resources stacked. It may be possible some resources have no data, thus they're not included in the stack. In a particular embodiment, the resources cannot be selected or deselected. In other words, the group is displayed as a whole and cannot be modified. FIG. 15 shows an example of a chart for a particular group including five nodes where seven different metrics are available for viewing.

Figure 16:
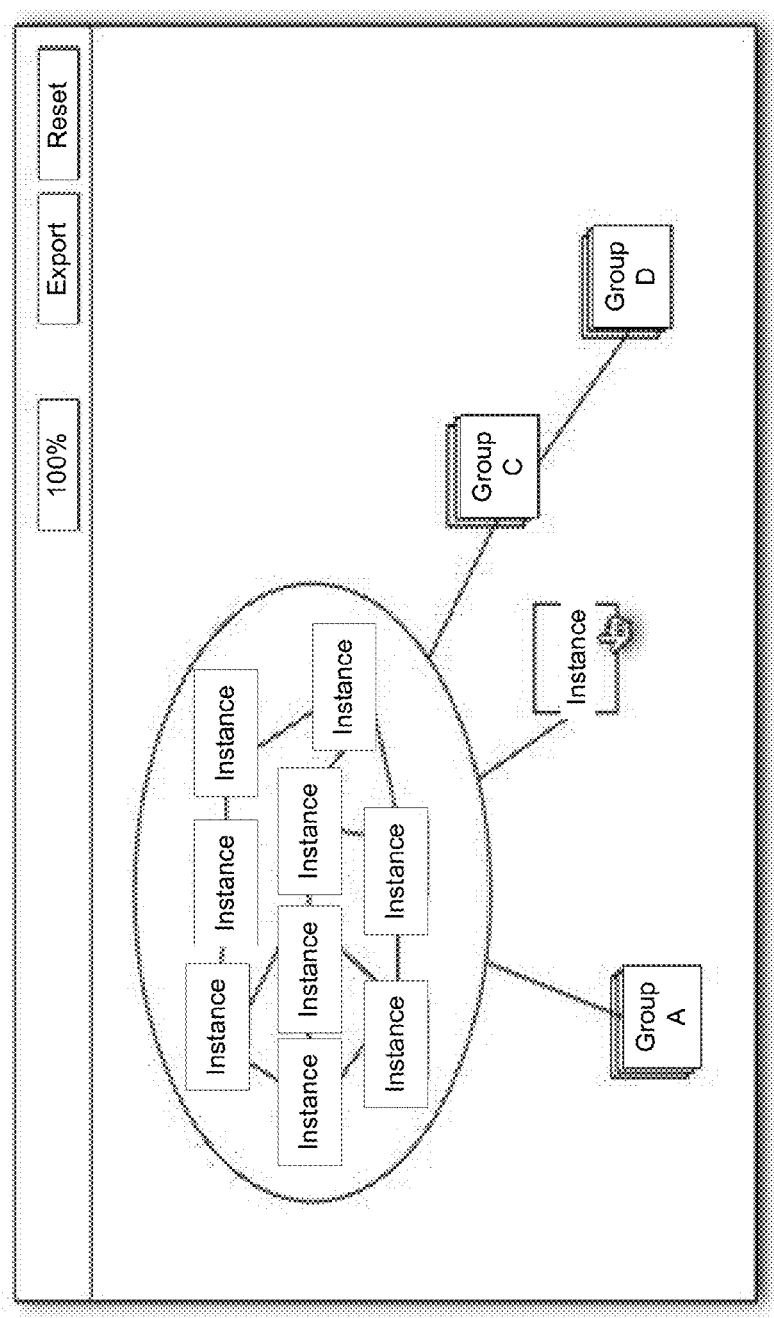
FIG. 16 illustrates intergroup and intragroup flows in accordance with one implementation of the present invention.

Flow groups can be created by a separate service that updates groups or flows and network services based on groups of nodes. In one embodiment, group metrics are not provided. Instead, an imbalance charts is generated for each flow metric. A group alarm will be raised when there is at least one alarm raised for any node in the group. FIG. 16 shows an intergroup flow within the oval and then flows between the expanded group and a number of other groups.

Next, groups in heatmaps are discussed. Within the global grouping controller, global family controls allow group families to be selected for viewing. The global family and global grouping controls are configured to display selected groups of a chosen family. In one embodiment, only flows with a source or a destination that is part of a selected family is displayed if no groups are selected.

Global family and grouping controls can be applicable when sorting is applied. Some examples of sorting include, but are not limited to, name sorting, group sorting, use of local sort controls, and sorting by group names. In one embodiment, only group names are displayed. In particular, only one group name may be displayed for all the nodes in a group. Names can be displayed for columns on the bottom or top of the heatmap. Names can be displayed for rows on the left of the heat map. In one example, names can be displayed in alphanumeric order.

Groups can be displayed in separate heatmaps that form a single grouping heatmap. In one embodiment, each separate heatmap may display one way flows between two groups. Via the interface, a user can input a selection to separate a group. In another embodiment, only one heatmap is displayed, showing the one way flows between two groups. Separate group heatmaps can display nodes in cells. The node cell size can depend on the square of each group's heatmap. An option can be provided that allows the user to go back and show the whole heatmap. The UI may allow the heatmap to be sorted by node names or some other parameter. Names can be displayed in alphanumeric order as default.

Figure 17:
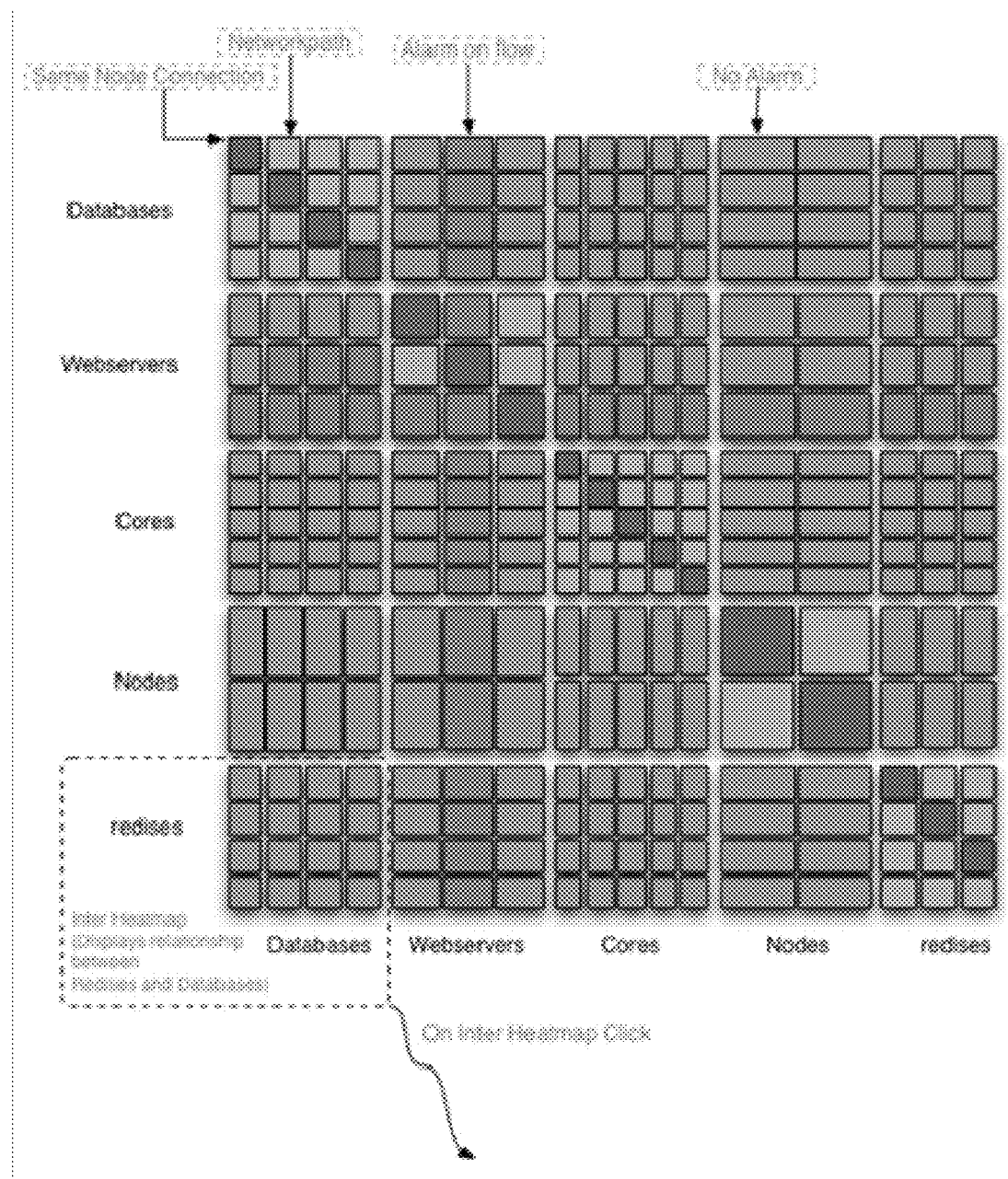
FIG. 17 shows a heatmap configuration in accordance with one implementation of the present invention.
Figure 18:
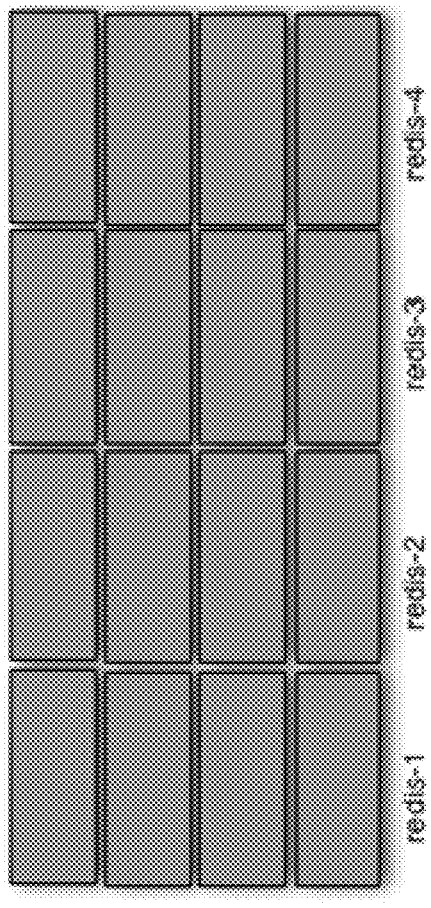
FIG. 18 illustrates an expanded portion of heatmap in FIG. 17.

FIG. 17 shows a heatmap configuration. FIG. 18 shows an expanded view of a portion of the heatmap in FIG. 17. The heat map indicates groups where an alarm is present. Additional examples of UI interface states related to node grouping are shown below in FIGS. 23A-O.

Tools for Grouping Nodes

As described above, tools can be provided that recommend a group structure for a set of ungrouped nodes, recommend a placement of a new node within an existing group structure, allow a user to manually create a group, and allow a user to manually manipulate existing groups, such as moving a node from one group to another group. The ability to group nodes can simplify the management of cloud systems, including many nodes. The ability of the system to generate an initial group structure for an existing set of nodes and recommend a placement of new nodes within an existing group structure can also simplify the management of a cloud system.

In one embodiment, the grouping of resources (nodes and flows) can be made using any suitable machine learning methods. To illustrate how the grouping methodology works, an analogy can be drawn between groups of nodes (e.g., VMs) in the cloud resource management system and groups of friends in a social network. In Table 1, in the system, groups can be formed from nodes. In the social network groups can be formed from a user's friends. An entity can be described by metadata. Of course, metadata for a node is different than metadata for friends. The metadata can be used to help define groups. In Table 1, two types of groups are listed: 1) smart groups and 2) custom groups. Smart groups can refer to automation of some aspect of the grouping process. Custom groups can refer to a manual aspect of the grouping process, i.e., based upon inputs provided by a user.

TABLE 1

Comparison of Cloud Resource Management System to Social Network

|  | Entity to group | Metadata | Types of Groups |
|---|---|---|---|
| Cloud Resource Management System | Node | AMI id, Instance Name, Security Group, . . . | Smart and Custom Groups of VMs |
| Social Network | Friends | Location, College, Interests, . . . | Smart and Custom Lists of friends |

Metadata attributes can be used by a grouping component within the system to group nodes together. A single attribute or different combinations of metadata attributes can be utilized in the grouping component. The choice of the attribute can significantly impact what grouping structure is generated from the grouping component. In one embodiment, logic associated with an expert system can be embedded within the grouping component. The logic can select/recommend attributes that may best suit a user's needs in regards to a grouping structure. In addition, the system may allow a user to manually select or modify metadata attributes that are used by the system. In one embodiment, selectable metadata attributes can include one or more of security groups, instance tags, load balancer, key pair or auto scaling groups. In another embodiment, the selectable metadata attributes can include one or more of process names, port numbers, different types of flow metrics and other types of performance characteristics.

An initial generation of a grouping structure can involve applying clustering techniques. The initial generation of the grouping structure can be referred to as the boot strapping phase. In the bootstrapping phase only unclassified data may be available, i.e., no classified data. Unclassified data means the nodes have not been assigned to groups so that the class can refer to a particular group. Thus, in the boot strapping phase the data can have the following characteristics:

A set of N features: $a_1, \ldots, a_N$ and a class c.

A set of M vectors with no class (unsupervised) of dimension N+1:
  a. $v_x=[a_{x,1}, a_{x,2}, \ldots, a_{x,N}, ?]$ for $x \in [1, \ldots, M]$
  b. Each vector $v_x$ represent a set of values for the N features.

The features can be the metadata.

Table 2 shows a structure for the data and Table 3 shows an example of the structure populated with some values.

TABLE 2

Structure for unclassified data prior to clustering

| Node | Feature $a_1$ | Feature $a_2$ | ... | Feature $a_N$ | Class |
|------|---------------|---------------|-----|---------------|-------|
| 1    | $a_{1,1}$     | $a_{2,1}$     | ... | $a_{N,1}$     | ?     |
| 2    | $a_{1,2}$     | $a_{2,2}$     | ... | $a_{N,2}$     | ?     |
| ...  | ...           | ...           | ... | ...           | ...   |
| M    | $a_{1,M}$     | $a_{2,M}$     | ... | $a_{N,M}$     | ?     |

TABLE 3

Structure for unclassified data with example values

| Node | Security Groups | Key Pair | ... | Tag   | Class |
|------|-----------------|----------|-----|-------|-------|
| 1    | securityGroup1  | kp1      | ... | tag1  | ?     |
| 2    | securityGroup1  | kp-US-1  | ... | tag2  | ?     |
| 3    | ...             | ...      | ... | ...   | ...   |
| 4    | securityGroup2  | kp3      | ... | tag2  | ?     |

A clustering algorithm can be used to generate class labels (groups) for the unclassified data. In this bootstrapping phase, there may not be any historical data available to predict the class labels. Therefore, an unsupervised machine learning algorithm, such as K-means with Euclidean distance), can be used to find clusters of similar data. The cluster centroids can be used as class labels.

K-means clustering is a method of vector quantization. In K-means clustering, n observations are partitioned into k clusters in which each observation belongs to the cluster with the nearest mean, serving as a prototype of the cluster. This results in a partitioning of the data space into Voronoi cells. An iterative refinement technique, often called the K-means algorithm, can be used to solve the problem. Given an initial set of K means, the algorithm proceeds by alternating between two steps: an assignment step and an update step. In the assignment step, each observation can be assigned to the cluster whose mean yields the least within-cluster sum of squares (WCSS). In the update step, the new means are calculated to be the centroids of the observations in the new clusters. The algorithm has converged when the assignments no longer change. Since both steps optimize the WCSS objective, and there only exists a finite number of such partitionings, the algorithm converges to a (local) optimum, but not necessarily a global optimum.

Figure 19:
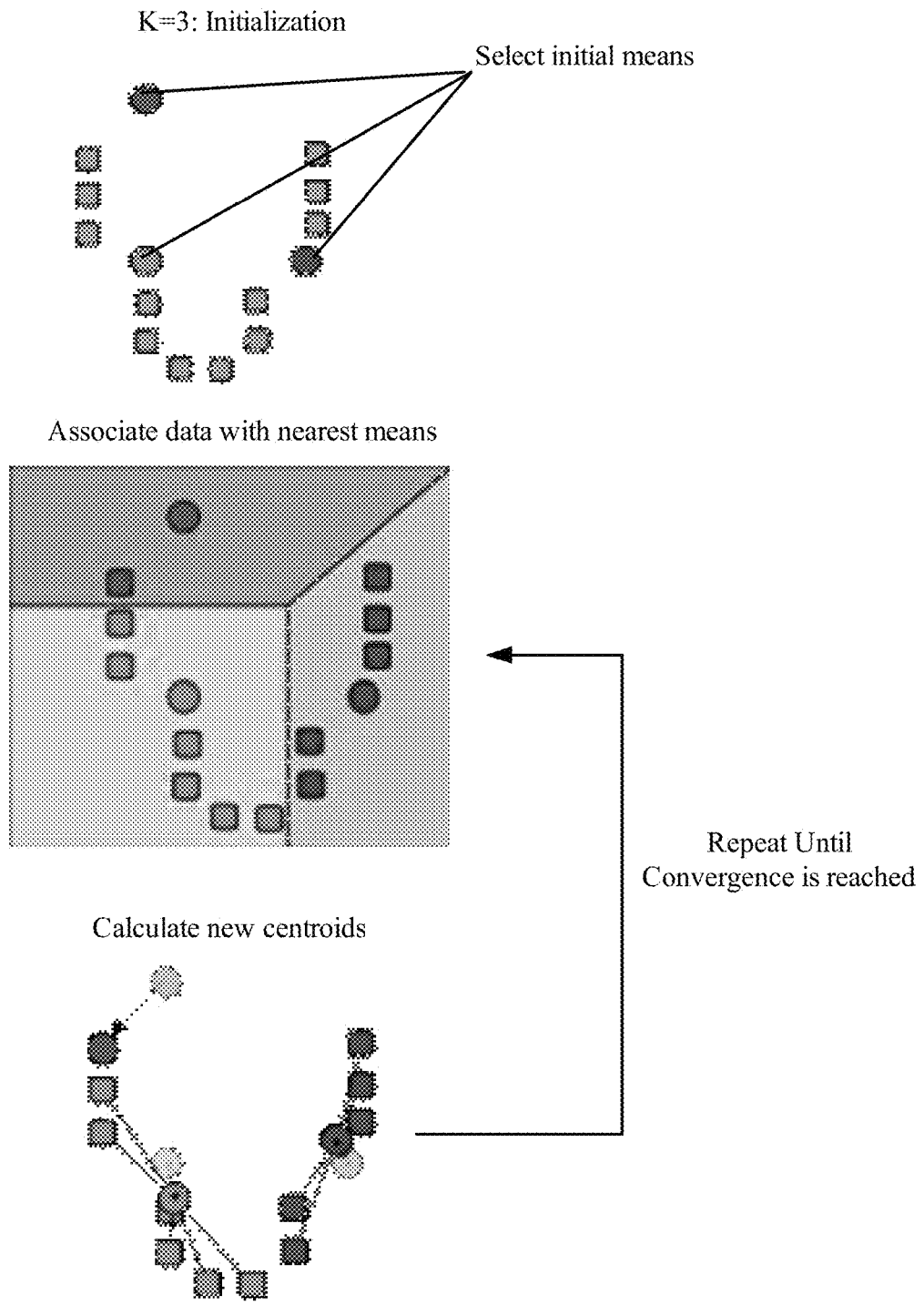
FIG. 19 shows an example of K-means clustering in accordance with a specific implementation of the present invention.

FIG. 19 shows an example of K-means clustering. The value of K is a desired number of partitions. The value of K can be an input parameter. In one embodiment, the initial value of K can be greater than the number of data points (also, referred to as observations). If this is the case, then some partitions may be created without members. The partitions without members can be removed during the iterative process. Thus, the value of K can decrease. Thus, as part of the iterative process, the system can converge to a particular value of K, i.e., the value of K is not specified a priori. In other embodiments, the system may allow a user to specify a certain number of partitions in which to divide the nodes.

Initial values can be generated for the means of each cluster. In FIG. 19, three initial means for each cluster are generated. In one embodiment, the initial means are randomly generated. The values of the means associated with the initial values of each cluster are related to the metadata for each node specified in each vector (e.g., a value associated with a name, a key pair, etc.). Next, a distance can be calculated between each node and each of three means for each cluster based upon the values in the vector associated with each node and the mean. In one embodiment, based upon the distance, each node can be assigned to the closet of three means.

Next, after each node is assigned to a cluster, a new centroid (mean) can be calculated for the cluster. Then, the distances between each node and the new centroids can be determined and the nodes can again be assigned to each of the three clusters. It is possible that one or more of the nodes may switch clusters. This process can continue until convergence, i.e., the nodes are no longer changing clusters from iteration to iteration.

Distance calculations depend on the value and its format of the data being compared. For instance, for a value which is a name, the distance can be binary where if the names being compared match, the distance is zero whereas if the names don't match the distance is 1. If there is some structure to the names such that different portions of the name have different meanings then a different distance calculation may be utilized. For example, when a name has a first portion with a first meaning and a second portion with a second meaning, then a first distance value can be attributed when only first portions match, a second distance value can be attributed when only the second portions match, a third distance value can be attributed when the first and second portions match and a fourth distance value can be attributed when different neither the first portion and the second portion match.

In above example, rather than being, a binary determination of distance, there are multiple distance values which are possible. In another example, the values in the vector can be two numbers and the distance can be based upon a comparison of the magnitude of the two numbers. In general, a specific distance determination can be made for each feature in a vector, wherein the possible distance values vary from feature to feature.

In some instance, the distance values can be scaled or weighted in some manner for each feature so that the distance values contributions from each feature are consistent with one another. In one embodiment, the distance values can be scaled or weighted such each feature contributes an approximately equal amount to the distance calculation. In other embodiments, the weighting or scaling factors can be configured such that the distance value determine from one feature is given more weight than the distance value determine from another feature.

K-means clustering is one example of cluster analysis which can be utilized. Cluster analysis can use different models. For example, clustering can use connectivity models, centroid models, distribution models, density models, subspace models, group models and graph-based models. The models can result in a hard clustering determination so that each object belongs to a cluster or not or soft clustering so that each object belongs to a cluster to a certain degree. Thus, the example of k-means clustering is provided for the purposes of illustration only and is not meant to be limiting.

After the clustering step, the data has class labels (classified data). This classified data can be used to build a predictive model to classify new incoming data points (e.g., in the case of the grouping, to group a new node that is discovered). Table 4 shows an example structure for the classified data.

TABLE 4

Structure for classified data after clustering

| Node | Feature $a_1$ | Feature $a_2$ | ... | Feature $a_N$ | Class |
|------|---------------|---------------|-----|---------------|-------|
| 1    | $a_{1,1}$     | $a_{2,1}$     | ... | $a_{N,1}$     | $C_1$ |
| 2    | $a_{1,2}$     | $a_{2,2}$     | ... | $a_{N,2}$     | $C_2$ |
| ...  | ...           | ...           | ... | ...           | ...   |
| M    | $a_{1,M}$     | $a_{2,M}$     | ... | $a_{N,M}$     | $C_M$ |

In various embodiments, it is possible that different clustering can be useful in different use cases. The system can be configured to generate and maintain different clusterings of the same or overlapping data. For example, a first set of nodes can be grouped in two, three or a plurality of different ways, depending on what attributes are selected for the groupings.

The groupings are not necessarily restricted to performance optimization, but can be more generally applied to intelligent cloud management. The ISO FCAPS model (fault, accounting, configuration, performance and security) is the ISO Telecommunications Management Network model and framework for network management. Within the model, different management tasks can be used to specify different use cases in which different features are important. The different features can be used to develop different groupings which are maintained by the system.

Thus, performance control and optimization are one example for which groupings can be developed, and the system is not limited to this example. For instance, security is also very relevant and different security groupings can be maintained within the system. Groups can be developed for faults in regards to fault detection, missing communication or even fault resiliency. In general, use cases can be developed for all other management functions.

Grouping tools can also useful for the architecture design of scalable networked applications (in Cloud or not). For example, the tools can be used to define "scaling metrics" based on the summing of individual metrics. These metrics can be linked to performance goals, can be used to help in the planning and sizing of an infrastructure as a function of response time and can be used as a base for benchmarking.

In yet other embodiments, entities, such as nodes, can be automatically grouped based on the communication patterns or flow topology. The analysis of the group topology can enable detection of anomalies such as connectivity problems, e.g., unexpected connections or missing connections). Pattern recognition, as well as characterization of traffic demand, can be used in this process.

Next, a steady state phase is discussed. In the steady-state phase, some amount of classified data is available. That is, the steady-state phase is when classified data is available (e.g., the data in Table 4). In this phase the data can have the following characteristics:

A set of N features: $a_1, \ldots, a_N$ and a class c.

A set of M vectors with class of dimension N+1 where $v_x = [a_{x,1}, a_{x,2}, \ldots, a_{x,N}, c_x]$ for $x \in [1, \ldots, M]$ and each vector $v_x$ represent a set of values for the N features.

When there is a new incoming data point that needs to be classified, a predictive model based upon the currently available classified data can be used. For example, a new node that needs to be grouped can be discovered by the system. In this case, the available classified data can be used to build a model that will predict in which group to classify the new data point.

The class of the classified data can be modified by a user interaction. For example, a node can be moved from one group to another group via the system UI. The user interaction results in a new class for the node and, hence, the classified data changes. When the classified data is changed, the predictive model used to recommend a node grouping changes.

Each time there is a new incoming data point, a predictive model can be built from the classified data with a machine learning algorithm, such as J48 decision tree, a neural network, or the KOAC algorithm illustrated below in FIG. 19.

For a new node, the algorithm can involve forming an incoming data point which includes a vector of the node's features. As described above, a predictive model can be built from the classified data. In particular embodiments, all or a portion of the classified data can be used. For example, the system can be configured to receive user inputs that specify the features that are used to build the predictive model. Using the predictive model, the class of the new data point can be predicted. When the predictive model is next built, the new data point can become part of the classified data.

As described above, the classified data can be modified based on user interaction. For example, in the case of the grouping, data features are the network characteristics of a node, such as, but not limited to, load balancer, security group, tag, etc. The class is the group of the node. Therefore, when a user moves a node from one group to another group, this user modification will change the class of this node's vector in the data. An example of a user interaction on the classified data is shown in tables 5 and 6.

TABLE 5

Classified data before user interaction where node 1 is in group 1

| Node | Feature $a_1$ | Feature $a_2$ | ... | Feature $a_N$ | Class |
|---|---|---|---|---|---|
| 1 | $a_{1,1}$ | $a_{2,1}$ | ... | $a_{N,1}$ | $c_1$ |
| 2 | $a_{1,2}$ | $a_{2,2}$ | ... | $a_{N,2}$ | $c_2$ |
| ... | ... | ... | ... | ... | ... |
| M | $a_{1,M}$ | $a_{2,M}$ | ... | $a_{N,M}$ | $c_M$ |

TABLE 6

Classified data after user interaction where node 1 was moved to group 3

| Node | Feature $a_1$ | Feature $a_2$ | ... | Feature $a_N$ | Class |
|---|---|---|---|---|---|
| 1 | $a_{1,1}$ | $a_{2,1}$ | ... | $a_{N,1}$ | $c_3$ |
| 2 | $a_{1,2}$ | $a_{2,2}$ | ... | $a_{N,2}$ | $c_2$ |
| 3 | ... | ... | ... | ... | ... |
| M | $a_{1,M}$ | $a_{2,M}$ | ... | $a_{N,M}$ | $c_M$ |

In particular embodiments, it is possible that more than one type of grouping is associated with a set of nodes. The system can be configured to maintain a predictive model associated with each type of grouping and then provide a recommendation for placing a new mode in each type of grouping. The different types of groupings do not have to be created all at once. For example, initially a configuration of a first type of grouping can be generated, starting with unclassified data and progressing to classified data. Subsequently, a new grouping type can be created. If the previously generated classified data is of use, then some portion of it can be utilized for generating the initial configuration of the new grouping type. It is also possible to generate the initial configuration of the new grouping type using only unclassified data. Via the UI, a user may be able to add new grouping types and delete previously created grouping types.

Figure 20:
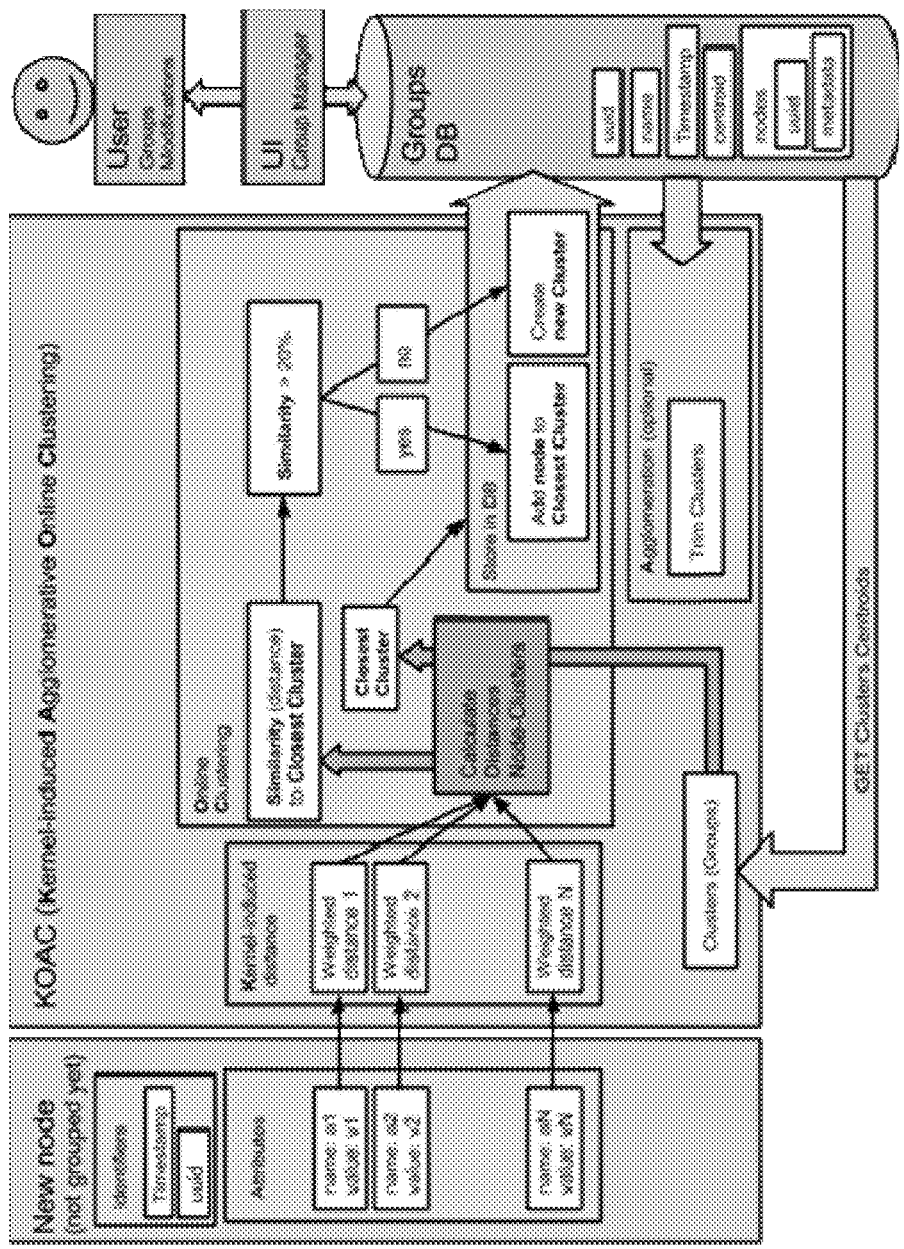
FIG. 20 is a diagrammatic representation of an example of using a machine learning algorithm to classify a new node in accordance with an alternative implementation of the present invention.
Figure 21:
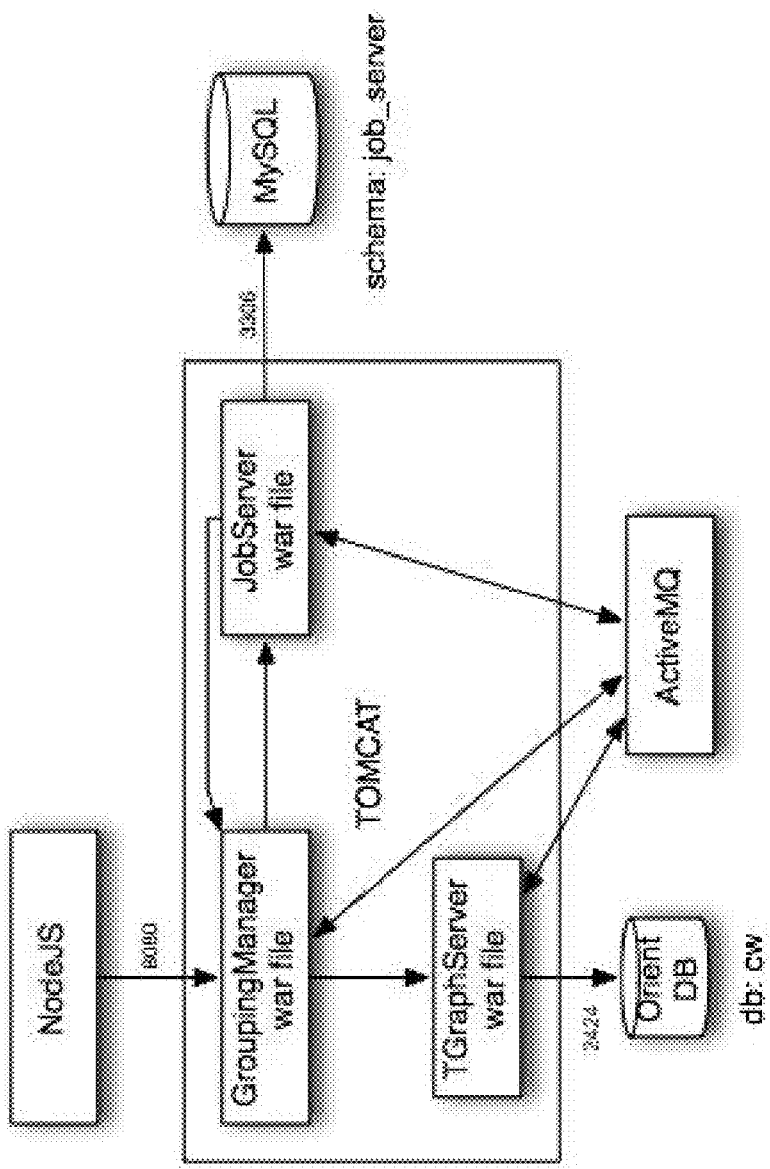
FIG. 21 shows a configuration of a test case in accordance with one embodiment of the present invention.

Next a grouping test case and examples are described. FIG. 20 shows components of a grouping test case. The three building blocks of the grouping are: (1) grouping Manager, (2) TGraph Server, and (3) Job Server. The grouping manager is the entity that creates groups of nodes and flows after reception of a job from the job server. The job server is the entity receiving and dispatching jobs to the different services of the system. In the case of the grouping, there can be two services at play: grouping manager and TGraph server. Both services can send and receive jobs from the TGraph server. The Tgraph Server can be the entity that is in charge of representing a cloud infrastructure—such as an AWS environment discovered by the system—as a graph. FIG. 22 illustrates a configuration of a test case.

As a test case environment, the following entities can be defined. Three load balancers (LB) with the following names (refer to AWS ESB for more info), lb.x, lb.y and lb.z, respectively. Three security Groups (SG) with the following Names, sg.x, sg.y and sg.z, respectively. Three Key Pairs (KP) with the following names: key.x.pem, key.z.pem and key.y.pem, respectively. Three auto scaling groups (ASG) with the following Names, asg.x, asg.y and asg.z.

Test Case 1: Test Set Up

Total number of instances in AWS environment: 4

Instances Characteristics:

| node ID # | | Tag | | | SG | KP | LB | ASG |
|---|---|---|---|---|---|---|---|---|
| 1 | Key | Name | tag.a | tag.b | sg.x | key.x | lb.x | asg.x |
|   | Value | node.x.1 | tag.a.x | tag.b.x | | | | |
| 2 | Key | Name | tag.a | tag.b | sg.x | key.x | lb.x | asg.x |
|   | Value | node.x.2 | tag.a.x | tag.b.x | | | | |
| 3 | Key | Name | tag.a | tag.b | sg.x | key.x | lb.x | asg.x |
|   | Value | node.y.1 | tag.a.x | tag.b.x | | | | |
| 4 | Key | Name | tag.a | tag.b | sg.x | key.x | lb.x | asg.x |
|   | Value | node.y.2 | tag.a.x | tag.b.x | | | | |

Test Case 1: Create Group Family

Create a Group Family by clicking on "Create Family" in the Group Manager tab. A pop-up similar to the one shown in FIG. 22 can be displayed:

The following characteristics can be selected to group on: a) Tag Name—tag.a and tag.b, b) Load Balancers—lb.x, lb.y and lb.z, c) Security Groups—sg.x, sg.y and sg.z, d) Key Pairs—key.x.pem, key.z.pem and key.y.pem and e) Scaling Groups—asg.x, asg.y and asg.z.

Test Case 1: Expected Result

Two Groups can be created, with the following characteristics:

| Group Name | Nodes ID # | | | Group Details | | | SG | KP | LB | ASG |
|---|---|---|---|---|---|---|---|---|---|---|
| tag:Name:name.x | 1, 2 | | | Tag | | | SG | KP | LB | ASG |
| | | Key | Name | tag.a | tag.b | | sg.x | key.x | lb.x | asg.x |
| | | Value | node.x | tag.a.x | tag.b.x | | | | | |
| tag:Name:name.y | 3, 4 | | | Tag | | | SG | KP | LB | ASG |
| | | Key | Name | tag.a | tag.b | | sg.x | key.x | lb.x | asg.x |
| | | Value | node.y | tag.a.x | tag.b.x | | | | | |

Test Case 2: Test Set Up

Total number of instances in AWS environment: 4

Instances Characteristics:

| node ID # | | Tag | | | SG | KP | LB | ASG |
|---|---|---|---|---|---|---|---|---|
| 1 | Key | Name | tag.a | tag.b | sg.x | key.x | lb.x | asg.x |
|   | Value | node.x.1 | tag.a.x | tag.b.x | | | | |
| 2 | Key | Name | tag.a | tag.b | sg.x | key.x | lb.x | asg.x |
|   | Value | node.x.2 | tag.a.x | tag.b.x | | | | |
| 3 | Key | Name | tag.a | tag.b | sg.x | key.x | lb.x | asg.x |
|   | Value | node.x.3 | tag.a.x | tag.b.x | | | | |
| 4 | Key | Name | tag.a | tag.b | sg.x | key.x | lb.x | asg.x |
|   | Value | node.x.3 | tag.a.x | tag.b.x | | | | |

Test Case 2: Group Family

A Group Family can be created, for example, by clicking on a "Create Family" option in the a Group Manager tab in the UI. A pop-up similar to the one below will appear for selecting various characteristics of the family:

Select the following characteristics to group on via interface: a) Tag Name—tag.a and tag.b, b) Load Balancers—lb.x, lb.y and lb.z, c) Security Groups—sg.x, sg.y and sg.z, d) Key Pairs—key.x.pem, key.z.pem and key.y.pem, e) Scaling Groups—asg.x, asg.y and asg.z.

Test Case 2: Expected Result

Two Groups can be created, with the following characteristics:

| Group Name | Nodes ID # | Group Details | | | | | | |
|---|---|---|---|---|---|---|---|---|
| key:key.x | 1, 2 | | Tag | | | SG | KP | LB | ASG |
| | | Key | Name | tag.a | tag.b | sg.x | key.x | lb.x | asg.x |
| | | Value | node.x | tag.a.x | tag.b.x | | | | |
| key:key.y | 3, 4 | | Tag | | | SG | KP | LB | ASG |
| | | Key | Name | tag.a | tag.b | sg.x | key.x | lb.x | asg.x |
| | | Value | node.x | tag.a.x | tag.b.x | | | | |

Additional Example UI States

FIG. 23A illustrates a UI for viewing all families in accordance with one embodiment of the present invention. For example, selecting an "All" button 2302 on the UI results in Families A, B, and C being displayed. The groups of all the families can also be shown. For instance, Family A includes Groups A, B, C, and D. A user may also display only the smart families by selection of the "Smart Families" button 2302a, and display only the custom families by "Custom Families" button 2302b. If the "Smart Families" button 2302a was selected, only smart Families A and C would be displayed, excluding the custom Family B from the display.

Creation of a new family may be initiated by selection of "New Family" button 2304. Further UI's may then be presented to the user for choosing whether the new family will be a smart or custom family, as well as selection of metadata such as an identifier, instance name, security group, key pair, instance type, region, etc.

One of the families may be selected so that the groups of such family are displayed in more detail. For instance, one may select Family A by clicking on area 2306. FIG. 23B illustrates a detailed view of Family A. As shown, the individual instances of each group are displayed. In this example, more groups and corresponding instances can be viewed by scrolling, e.g., via 2308a or 2308b.

Instances can be moved between the groups of the family by any suitable UI mechanism. In the example of FIG. 23B, a user may select "group B" button 2310 to display the instances of group B, and these displayed instances can then be dragged to other groups. FIG. 23C illustrates display of the instances of Group B of Family A. All nodes for all groups, as opposed to only Group B, may also be displayed as shown in FIG. 23D, e.g., by selection of "Show All Nodes" button 2312a of FIG. 23C. The nodes/instances per group, such as shown in FIG. 23B, may again be displayed, e.g., via "Show Groups" button 2312b.

Figure 23E:
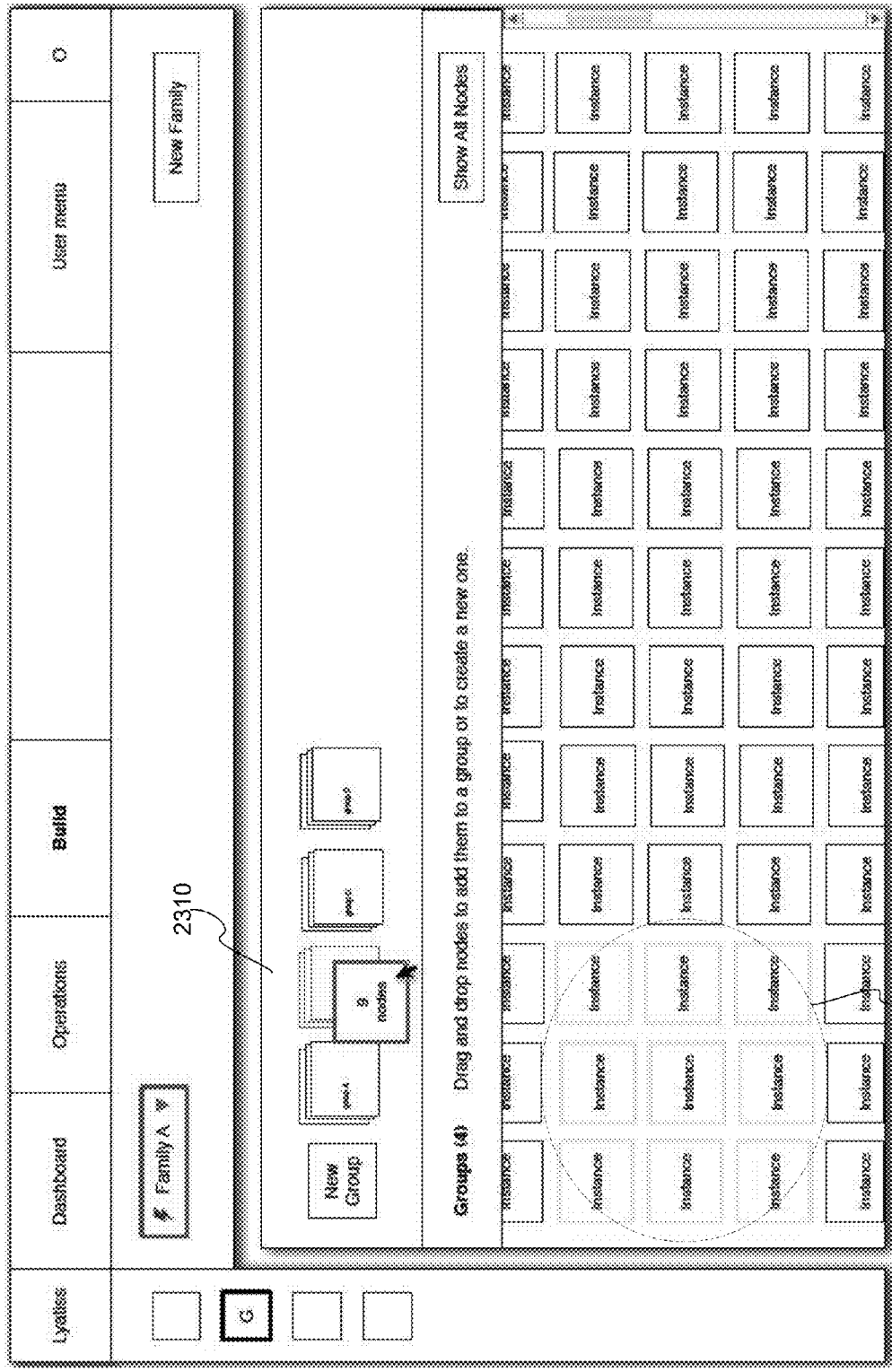
Figure 23F:
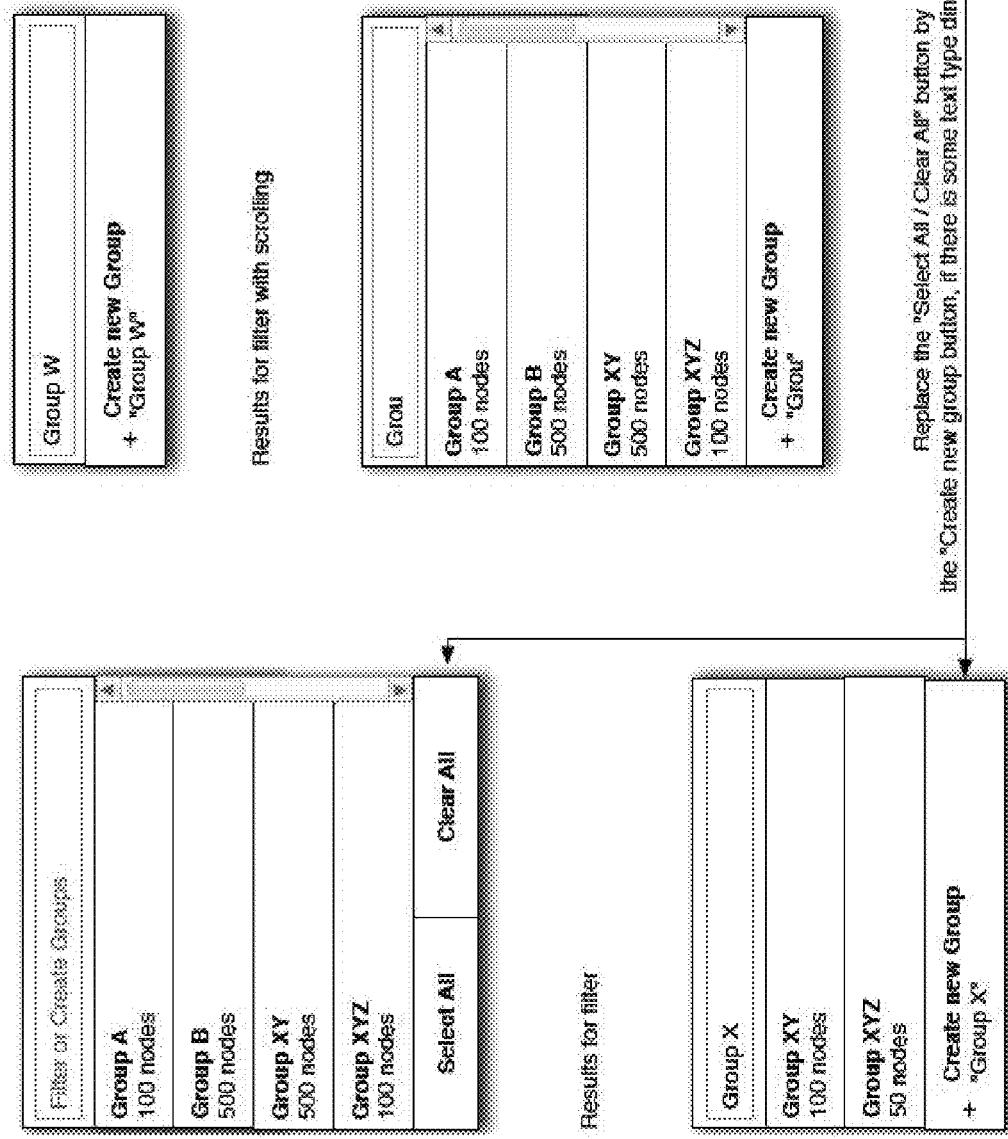

Regardless of whether all instances or a particular node's instances are displayed, instances can be dragged to a particular group as illustrated in FIG. 23E. As shown, instances 2314 are dragged to Group B area 2310 to then form part of Group B. Further example filtering results are shown in FIG. 23F.

Figure 23G:
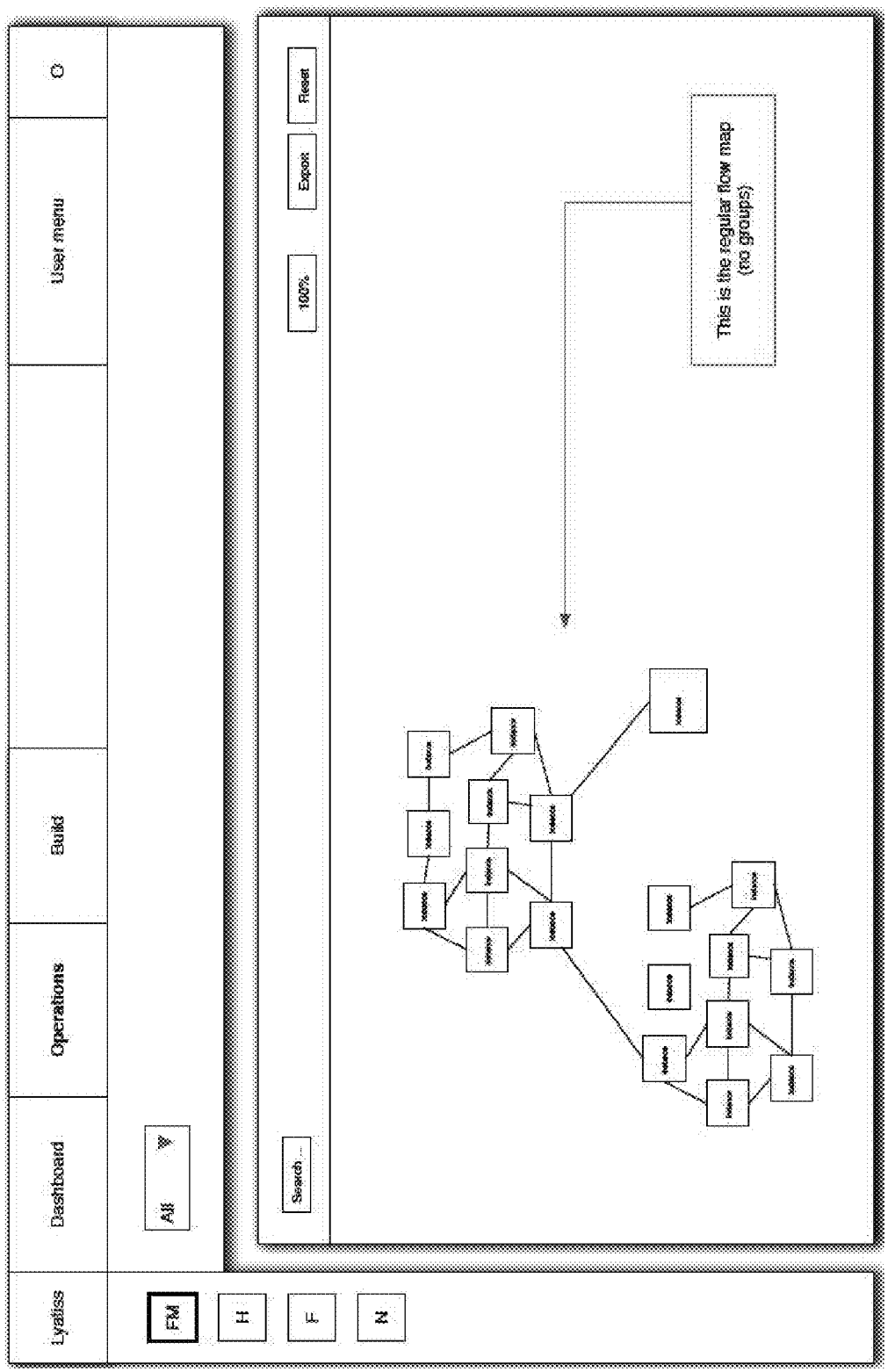
Figure 23H:
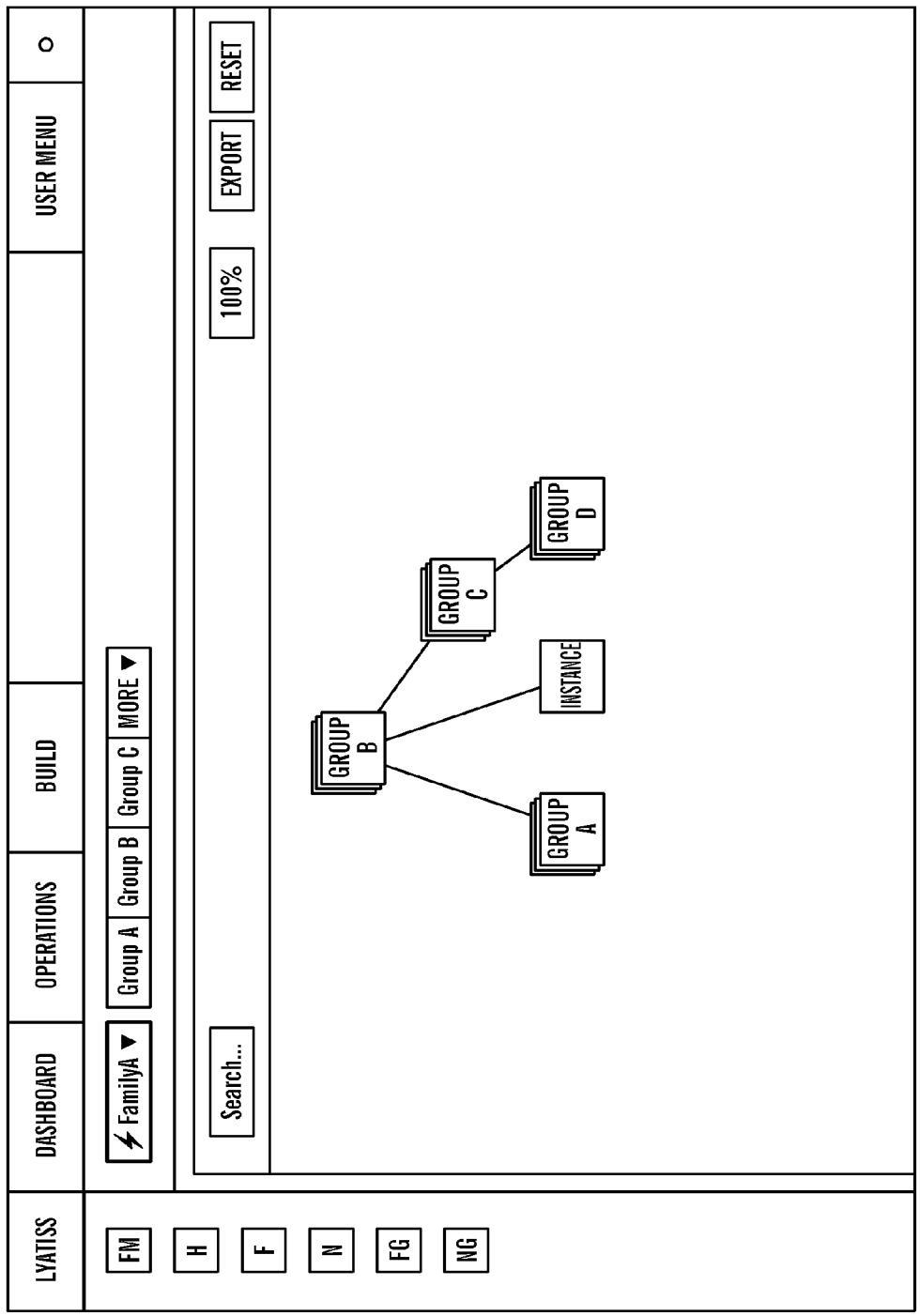
Figure 23I:
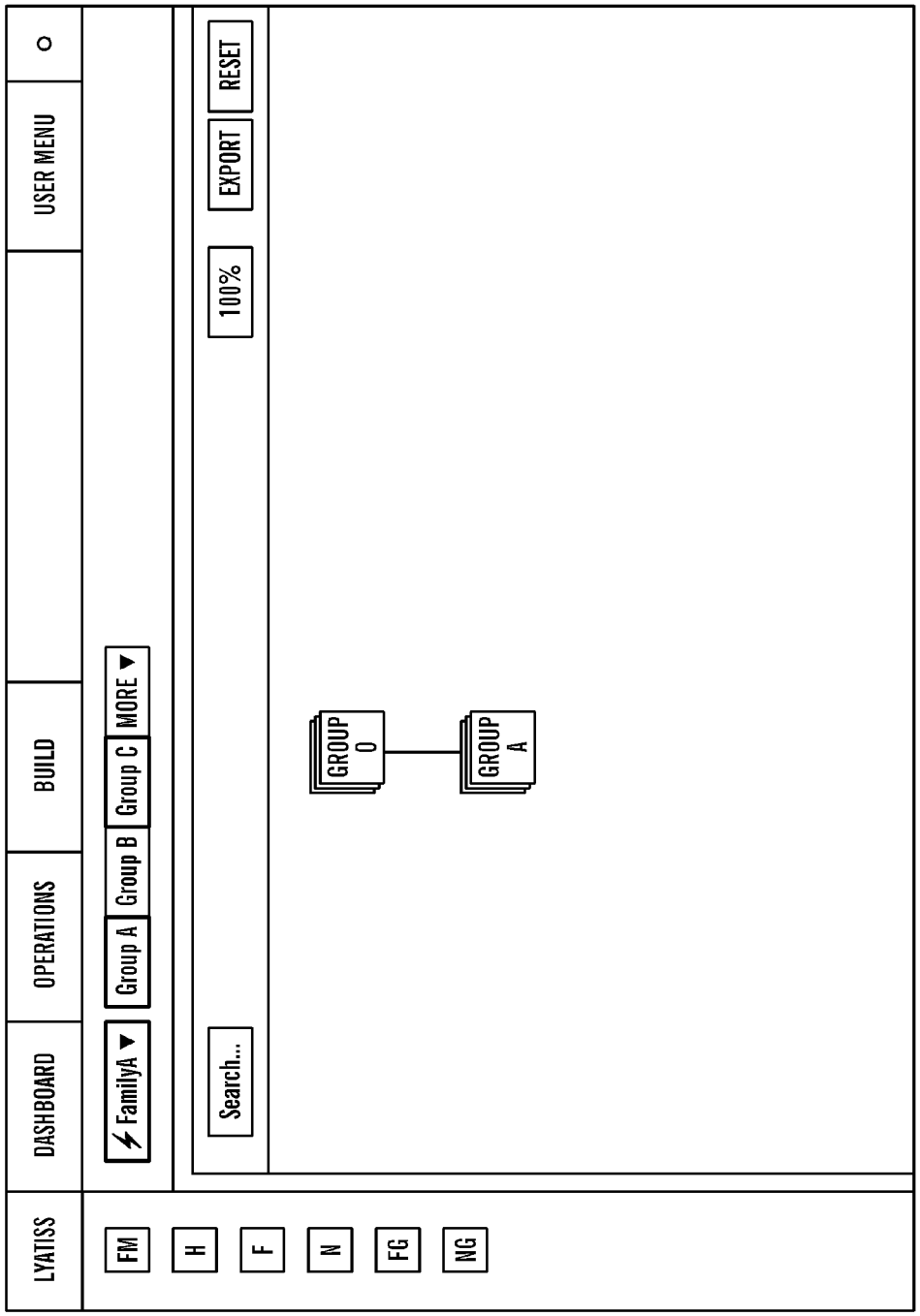

FIG. 23G shows a UI for displaying a flow map for all instances without reference to groups or families. In contrast, FIG. 23H shows a flow map for the groups of Family A, which has been selected for display. FIG. 23I illustrates the results for selecting display of Groups A and C of Family A.

Selection of a particular group may result in display of various metrics for such group, such as number of nodes and flows as well as other metrics described further herein. If only one group is selected. the flow map for the instances of such selected single group can be displayed automatically.

Figure 23J:
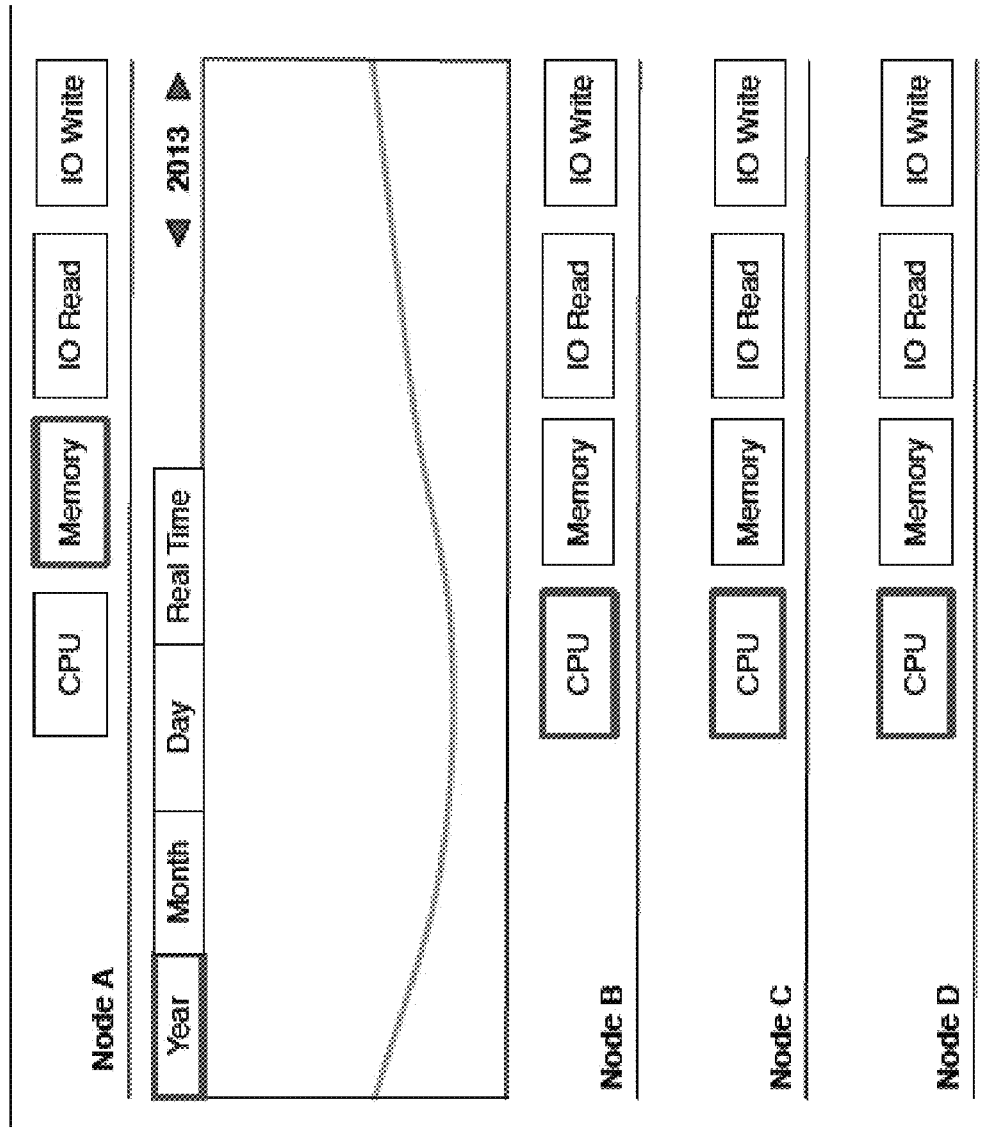
Figure 23K:
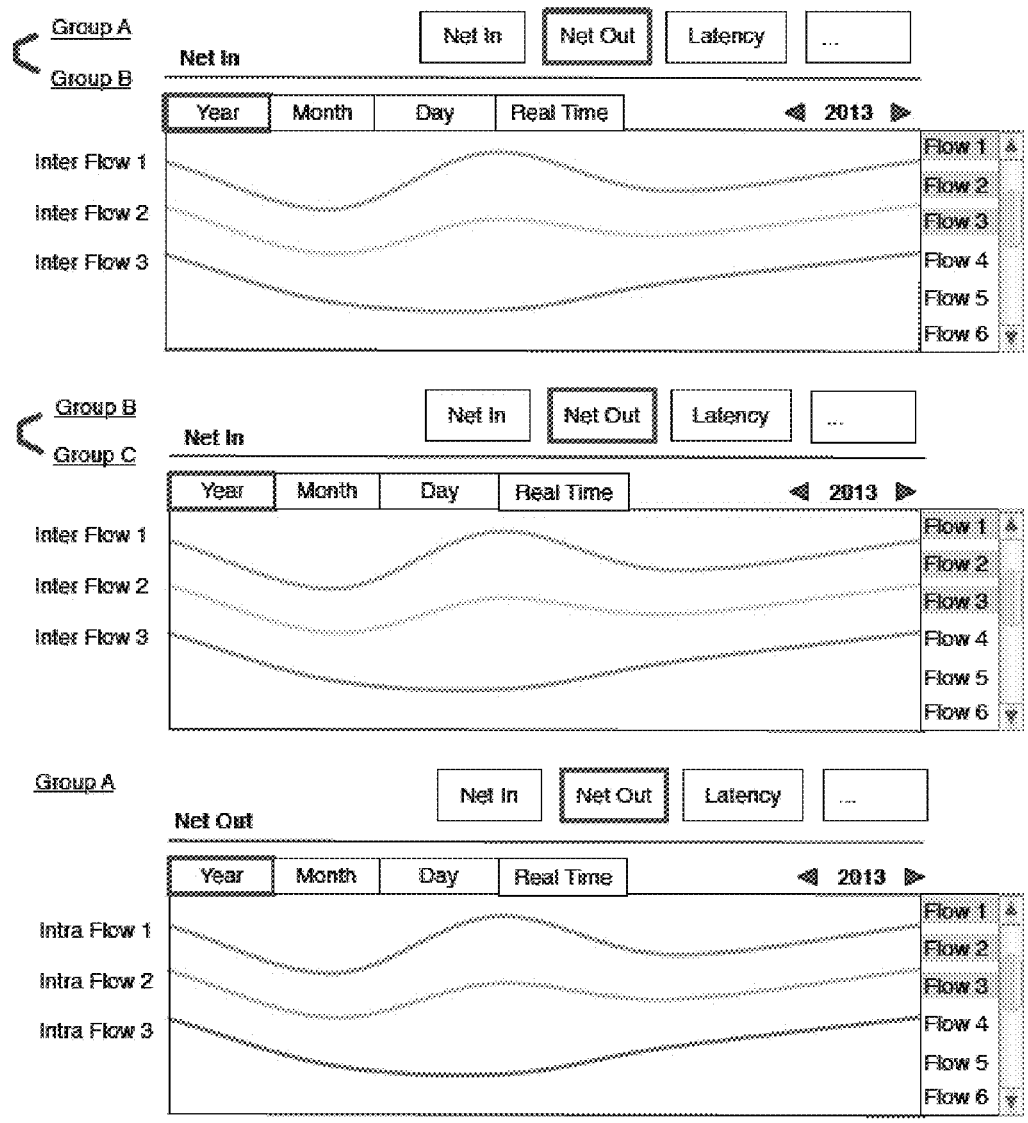
Figure 23L:
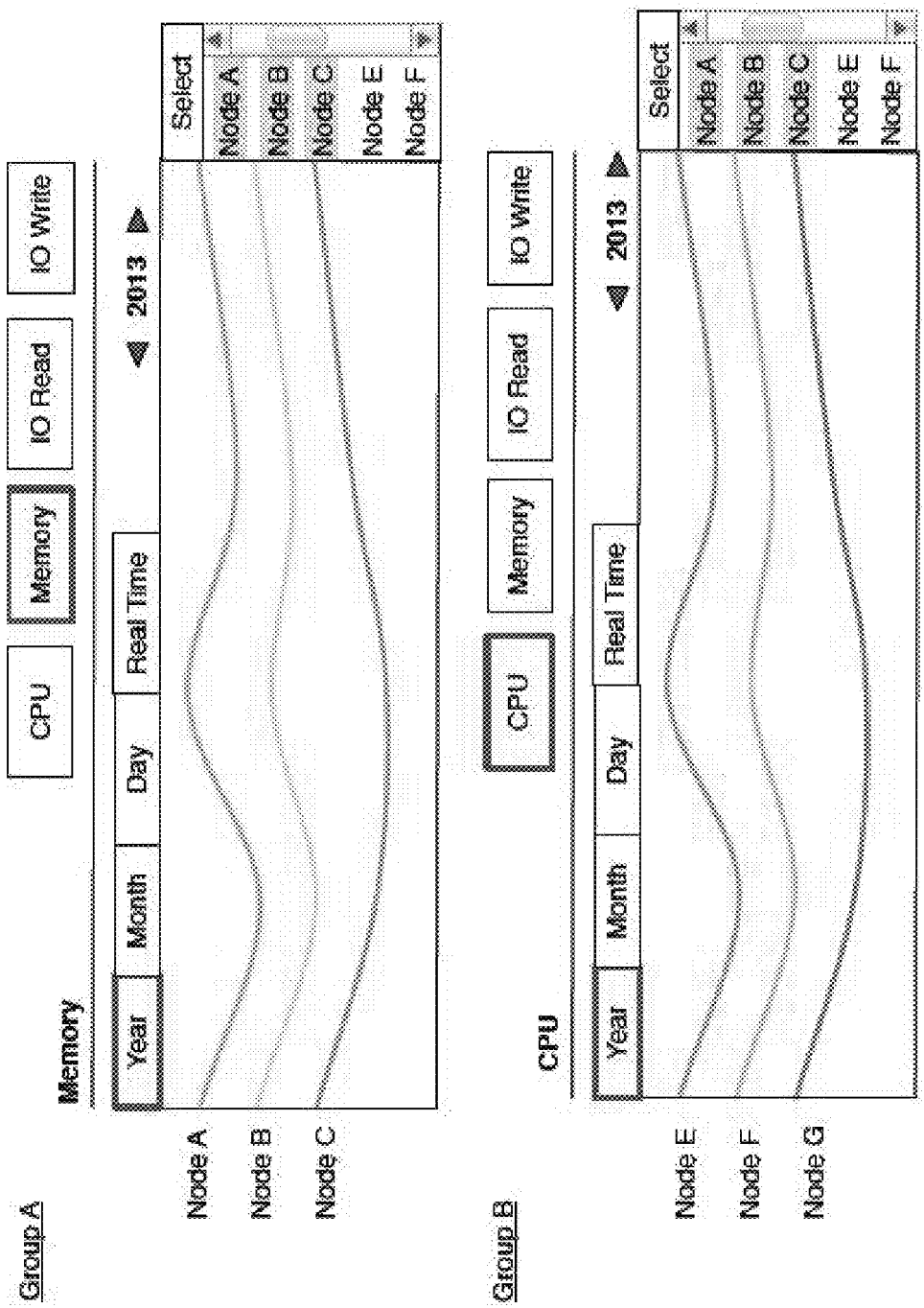

Selection of a particular instance can result in display of various node metrics, such as CPU, memory, disk, and network metrics. Such metrics may be displayed in any suitable manner, such as heat maps, percentage values, or a graph. FIG. 23J illustrates display of the memory usage over time for Node A. Similar graphs may be displayed for other metrics, such as CPU, IO Read, IO Write, Network In, Network Out, Latency, etc. For example, FIG. 23K illustrates selection of various flows, both inter- and intra-flows for selected groups. FIG. 23L shows selection of a plurality of nodes for an imbalance chart display (e.g., of memory or CPU).

Figure 23M:
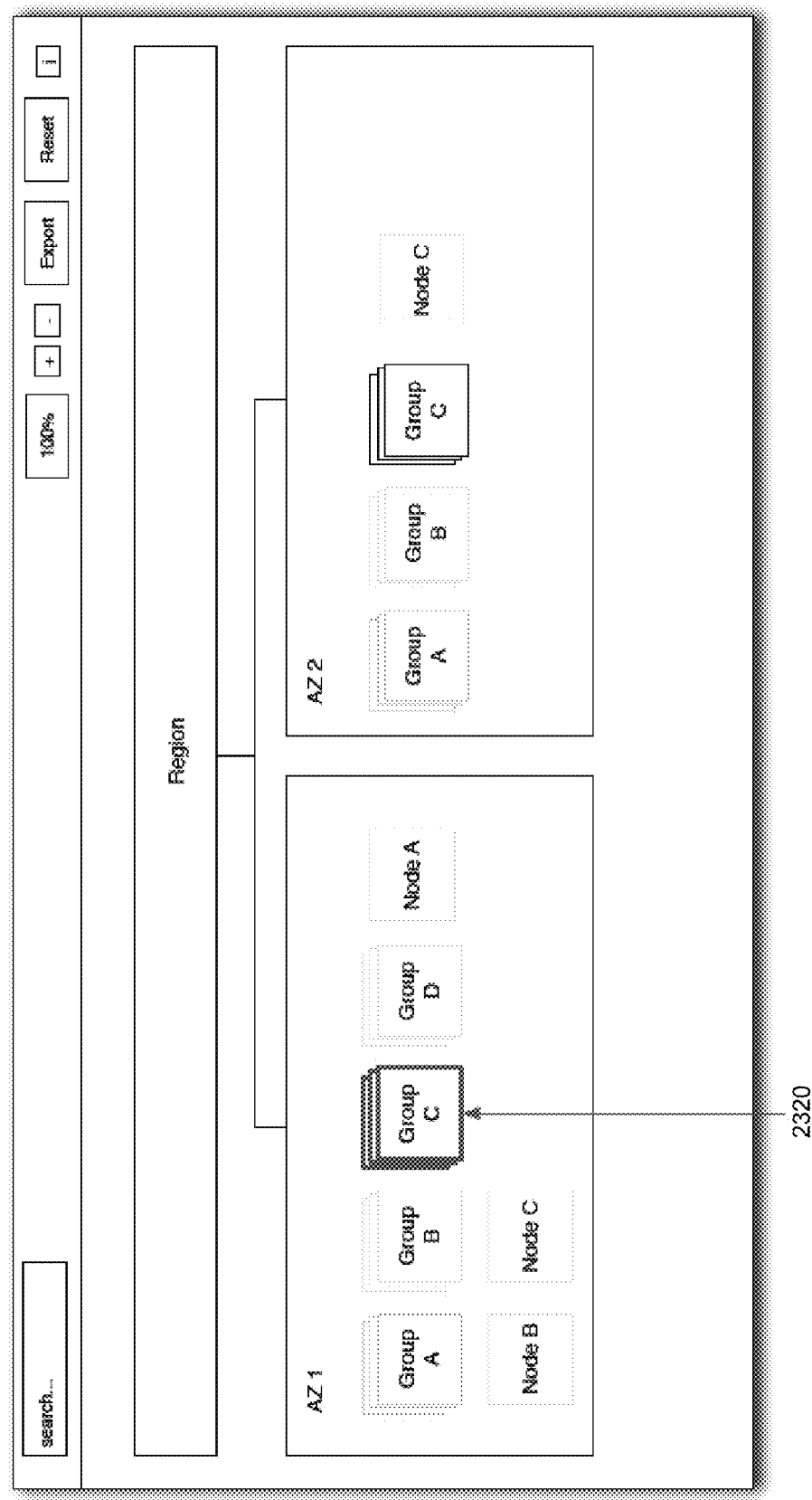
Figure 23N:
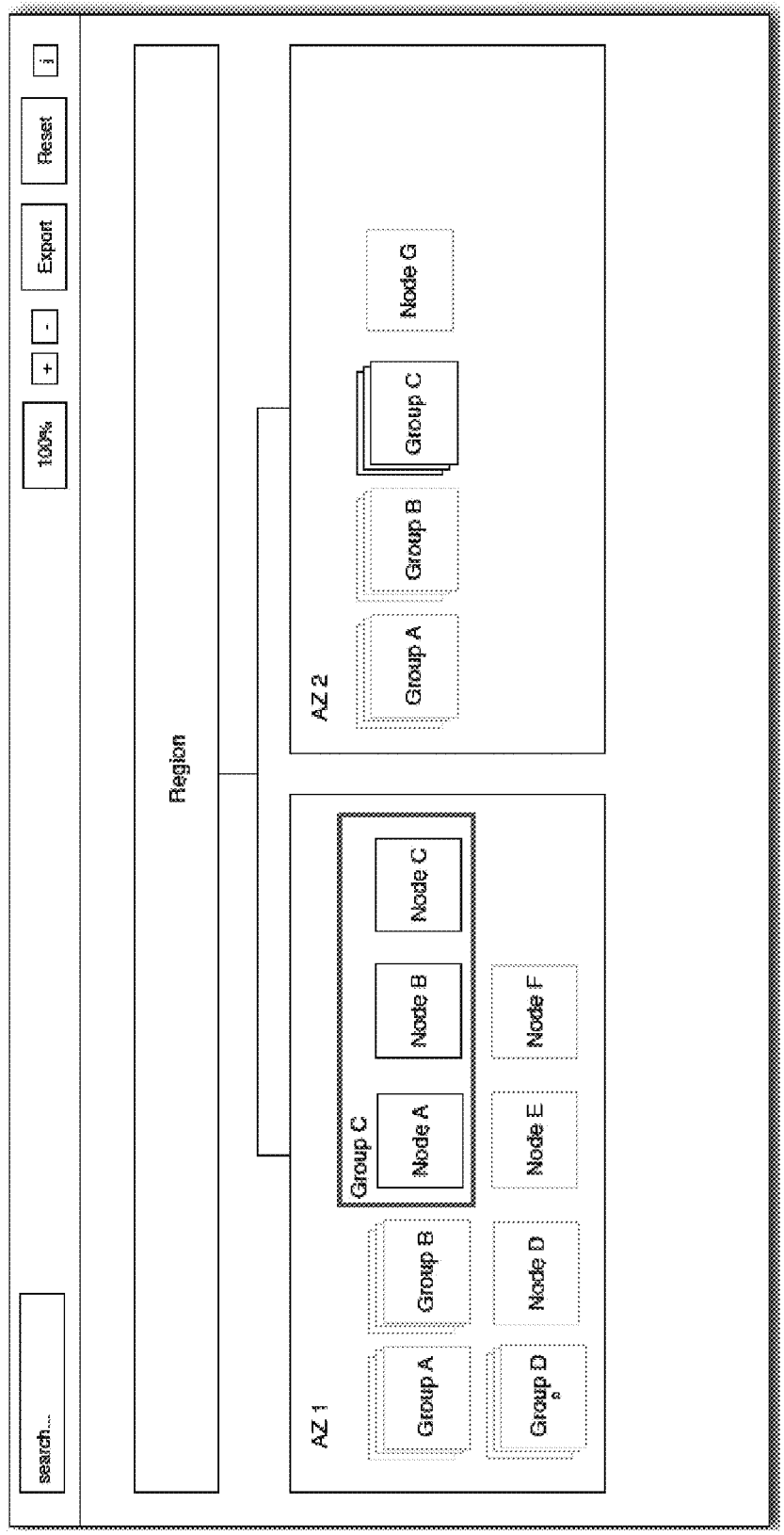
Figure 23O:
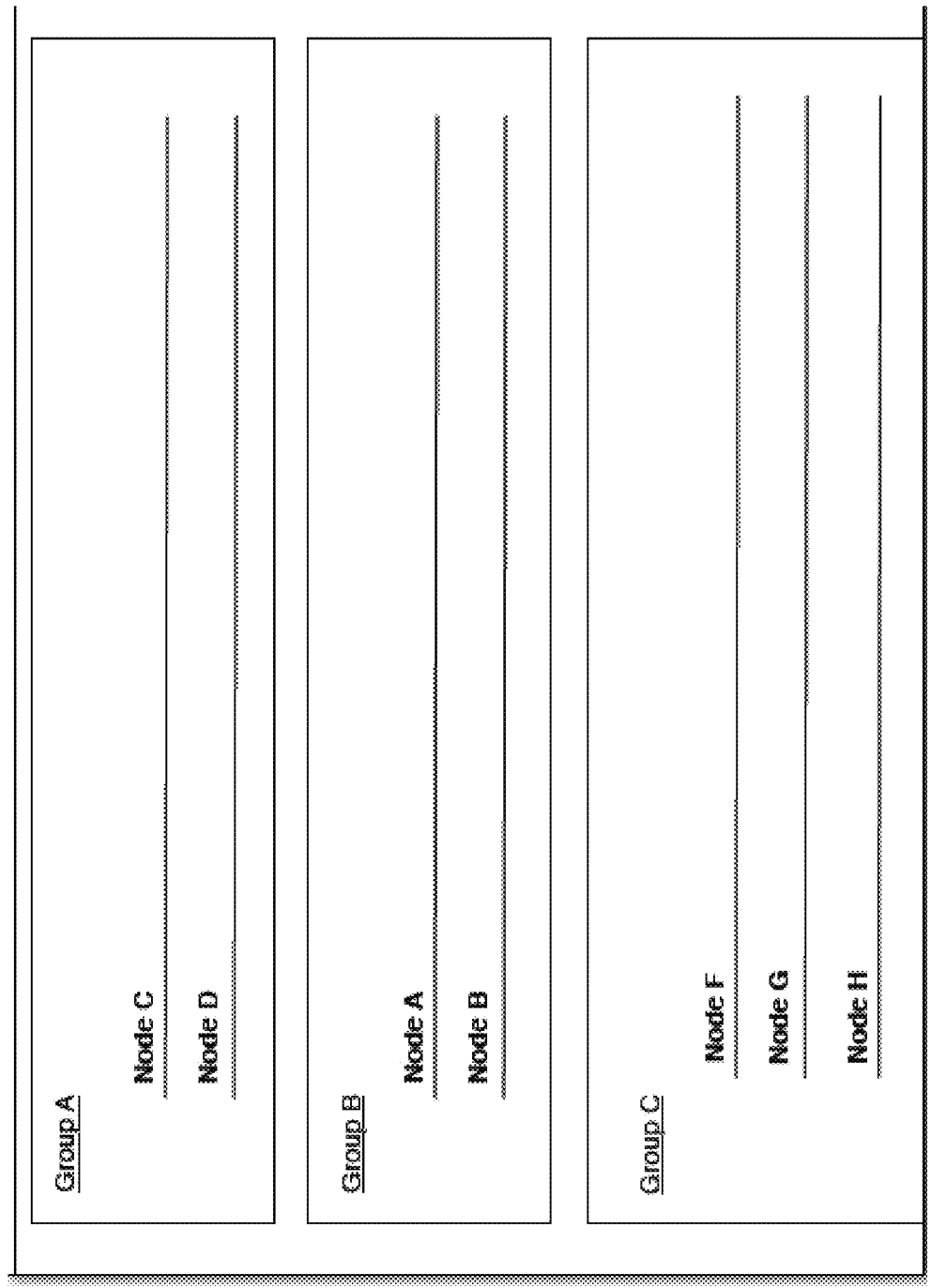

FIG. 23M shows selected groups and nodes per region area. Selection of a collapsed group, such as group C 2320, results in expansion of the group as illustrated in FIG. 23N. Various metrics regarding groups or nodes can also be displayed by selection of a particular node or group. Additionally, nodes may be listed for each selected group in a hierarchical manner as illustrated in FIG. 23O or simply listed for all groups if all groups are selected. Similarly, Network service identifiers can be displayed for selected groups or all groups.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for managing cloud infrastructure for client devices implemented by a network traffic management system comprising one or more network traffic apparatuses, client devices, or server devices, the method comprising:
   identifying virtual resources associated with an execution of a user's applications in a cloud resource configuration comprising virtual machines, network services and storage;
   generating a first topology map of the identified virtual resources including a plurality of nodes;
   outputting the generated first topology map comprising the plurality of nodes;
   generating a vector associated with each of the plurality of nodes, wherein the generated vector comprises one or more features associated with each of the plurality of nodes;

determining a distribution of the plurality of nodes within two or more groups based on the generated vector, wherein the plurality of nodes are distributed based on a network data file; and outputting the second topology map comprising each of the two or more groups in one of a collapsed format based on the determined distribution of the plurality of nodes.

2. The method of claim 1, further comprising:
identifying a new node, based upon the distribution of plurality of nodes; and
determining an existing group of the two or more groups to place the new node, wherein the determining further comprises creating a new group to place the new node.

3. The method of claim 2, further comprising:
outputting the existing group or the new group in which to place the new node; and
receiving one of first input indicating a confirmation to place the new node in the existing group or the new group or second input indicating a request to place the new node in a group different from the existing group or the new group.

4. The method of claim 3, further comprising recommending the existing or new group to place the new node, wherein the recommendation is based on a machine learning algorithm that accounts for user modifications to the two or more groups and wherein the user modifications include moving nodes from one group to another group.

5. The method of claim 1, further comprising generating and providing performance characteristics associated with each group of the plurality of groups, wherein the performance metrics are provided for display in a user interface (UI), wherein the performance characteristics include flow information for pairs of groups and wherein the flow information pertains to latency or throughput.

6. A non-transitory computer readable medium having stored thereon instructions for secured SCEP enrollment for client devices comprising executable code which when executed by one or more processors, causes the processors to:
identify virtual resources associated with an execution of a user's applications in a cloud resource configuration comprising virtual machines, network services and storage;
generate a first topology map of the identified virtual resources including a plurality of nodes;
output the generated first topology map comprising the plurality of nodes;
generate a vector associated with each of the plurality of nodes wherein the generated vector comprises one or more features associated with each of the plurality of nodes;
determine a distribution of the plurality of nodes within two or more groups based on the generated vector, wherein the plurality of nodes are distributed based on a network data file; and
output the second topology map comprising each of the two or more groups in one of a collapsed format based on the determined distribution of the plurality of nodes.

7. The non-transitory computer readable medium as set forth in claim 6, further comprising: identify a new node, based upon the distribution of plurality of nodes; and determine an existing group of the two or more groups to place the new node, wherein the determining further comprises creating a new group to place the new node.

8. The non-transitory computer readable medium as set forth in claim 7 further comprising: output the existing group or the new group in which to place the new node; and receive one of first input indicating a confirmation to place the new node in the existing group or the new group or second input indicating a request to place the new node in a group different from the existing group or the new group.

9. The non-transitory computer readable medium as set forth in claim 6 further comprises generate and provide performance characteristics associated with each group of the plurality of groups, wherein the performance metrics are provided for display in a user interface (UI), wherein the performance characteristics include flow information for pairs of groups and wherein the flow information pertains to latency or throughput.

10. A network traffic manager apparatus, comprising memory comprising programmed instructions stored in the memory and one or more processors configured to be capable of executing the programmed instructions stored in the memory to:
identify virtual resources associated with an execution of a user's applications in a cloud resource configuration comprising virtual machines, network services and storage;
generate a first topology map of the identified virtual resources including a plurality of nodes;
output the generated first topology map comprising the plurality of nodes;
generate a vector associated with each of the plurality of nodes wherein
the generated vector comprises one or more features associated with each of the plurality of nodes;
determine a distribution of the plurality of nodes within two or more groups based on the generated vector, wherein the plurality of nodes are distributed based on a network data file; and
output the second topology map comprising each of the two or more groups in one of a collapsed format based on the determined distribution of the plurality of nodes.

11. The network traffic manager apparatus as set forth in claim 10 wherein the one or more processors are further configured to be capable of executing the programmed instructions stored in the memory to: identify a new node, based upon the distribution of plurality of nodes; and determine an existing group of the two or more groups to place the new node, wherein the determining further comprises creating a new group to place the new node.

12. The network traffic manager apparatus as set forth in claim 11 wherein the one or more processors are further configured to be capable of executing the programmed instructions stored in the memory to: output the existing group or the new group in which to place the new node; and receive one of first input indicating a confirmation to place the new node in the existing group or the new group or second input indicating a request to place the new node in a group different from the existing group or the new group.

13. The network traffic manager apparatus as set forth in claim 10 wherein the one or more processors are further configured to be capable of executing the programmed instructions stored in the memory to generate and provide performance characteristics associated with each group of the plurality of groups, wherein the performance metrics are provided for display in a user interface (UI), wherein the performance characteristics include flow information for pairs of groups and wherein the flow information pertains to latency or throughput.

14. A network traffic management system, comprising one or more traffic management apparatuses, client devices, or server devices, the network traffic management system comprising memory comprising programmed instructions stored thereon and one or more processors configured to be capable of executing the stored programmed instructions to:

- identify virtual resources associated with an execution of a user's applications in a cloud resource configuration comprising virtual machines, network services and storage;
- generate a first topology map of the identified virtual resources including a plurality of nodes;
- output the generated first topology map comprising the plurality of nodes;
- generate a vector associated with each of the plurality of nodes wherein the generated vector comprises one or more features associated with each of the plurality of nodes;
- determine a distribution of the plurality of nodes within two or more groups based on the generated vector, wherein the plurality of nodes are distributed based on a network data file; and
- output the second topology map comprising each of the two or more groups in one of a collapsed format based on the determined distribution of the plurality of nodes.

15. The network traffic management system as set forth in claim 14 wherein the one or more processors are further configured to be capable of executing the programmed instructions stored in the memory to: identify a new node, based upon the distribution of plurality of nodes; and determine an existing group of the two or more groups to place the new node, wherein the determining further comprises creating a new group to place the new node.

16. The network traffic management system as set forth in claim 15 wherein the one or more processors are further configured to be capable of executing the programmed instructions stored in the memory to: output the existing group or the new group in which to place the new node; and receive one of first input indicating a confirmation to place the new node in the existing group or the new group or second input indicating a request to place the new node in a group different from the existing group or the new group.

17. The network traffic management system as set forth in claim 14 wherein the one or more processors are further configured to be capable of executing the programmed instructions stored in the memory to generate and provide performance characteristics associated with each group of the plurality of groups, wherein the performance metrics are provided for display in a user interface (UI), wherein the performance characteristics include flow information for pairs of groups and wherein the flow information pertains to latency or throughput.

* * * * *